US008902864B2

(12) United States Patent
Laroia et al.

(10) Patent No.: US 8,902,864 B2
(45) Date of Patent: *Dec. 2, 2014

(54) CHOOSING PARAMETERS IN A PEER-TO-PEER COMMUNICATIONS SYSTEM

(75) Inventors: Rajiv Laroia, Far Hills, NJ (US); Junyi Li, Bedminster, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1601 days.

This patent is subject to a terminal disclaimer.

(21) Appl. No.: 11/621,978

(22) Filed: Jan. 10, 2007

(65) Prior Publication Data

US 2008/0002647 A1    Jan. 3, 2008

Related U.S. Application Data

(60) Provisional application No. 60/758,010, filed on Jan. 11, 2006, provisional application No. 60/758,011, (Continued)

(51) Int. Cl.
*H04W 4/00* (2009.01)
*H04L 27/26* (2006.01)

(Continued)

(52) U.S. Cl.
CPC ............. *H04W 72/02* (2013.01); *H04L 27/261* (2013.01); *H04W 40/24* (2013.01); *H04W*

(Continued)

(58) Field of Classification Search
USPC .................... 375/145; 455/434; 370/254–258
See application file for complete search history.

(56) References Cited

U.S. PATENT DOCUMENTS 2,972,743 A    2/1961  Svensson et al.
5,216,693 A    6/1993  Nakamura (Continued)

FOREIGN PATENT DOCUMENTS

CN    1310927 A    8/2001
CN    1327354 A    12/2001

(Continued)

OTHER PUBLICATIONS

International Search Report—PCT/US2007/060355, International Search Authority—European Patent Office—Jul. 23, 2007.

(Continued)

*Primary Examiner* — Gerald Johnson
(74) *Attorney, Agent, or Firm* — James K. O'Hare

(57) ABSTRACT

Systems and methodologies are described that facilitate choosing parameters to utilize in a local area peer-to-peer network. The parameters may relate to tone spacing, cyclic prefix, symbol time and the like. Further, the parameters may be a function of a state (e.g. peer discovery state control related traffic state, data related traffic state, . . . ) associated with the local area peer-to-peer network. Moreover, the local area peer-to-peer network may share spectrum with a wide area network; as such, parameters for the peer-to-peer network may be selected based on the type of wide area network (e.g., air interface technology)and/or wide area network related parameters.

50 Claims, 14 Drawing Sheets

Related U.S. Application Data filed on Jan. 11, 2006, provisional application No. 60/758,012, filed on Jan. 11, 2006, provisional application No. 60/845,052, filed on Sep. 15, 2006, provisional application No. 60/845,051, filed on Sep. 15, 2006, provisional application No. 60/863,304, filed on Oct. 27, 2006.

(51) Int. Cl.

| | | |
|---|---|---|
| *H04W 8/00* | (2009.01) | |
| *H04L 5/00* | (2006.01) | |
| *H04W 72/02* | (2009.01) | |
| *H04W 88/10* | (2009.01) | |
| *H04W 36/16* | (2009.01) | |
| *H04W 52/02* | (2009.01) | |
| *H04W 16/14* | (2009.01) | |
| *H04W 48/20* | (2009.01) | |
| *H04W 40/24* | (2009.01) | |
| *H04W 84/04* | (2009.01) | |
| *H04W 28/18* | (2009.01) | |
| *H04W 48/08* | (2009.01) | |
| *H04W 88/02* | (2009.01) | |
| *H04J 3/06* | (2006.01) | |
| *H04W 88/04* | (2009.01) | |
| *H04W 28/04* | (2009.01) | |
| *H04W 88/06* | (2009.01) | |
| *H04W 48/16* | (2009.01) | |
| *H04W 52/04* | (2009.01) | |
| *H04W 84/18* | (2009.01) | |
| *H04W 36/24* | (2009.01) | |

(52) U.S. Cl.
CPC ...... *8/005* (2013.01); *H04L 5/0035* (2013.01); *H04W 84/042* (2013.01); *H04L 27/2601* (2013.01); *H04W 28/18* (2013.01); *H04W 48/08* (2013.01); *H04W 88/10* (2013.01); *Y02B 60/50* (2013.01); *H04L 5/0048* (2013.01); *H04W 88/02* (2013.01); *H04J 3/0602* (2013.01); *H04W 88/04* (2013.01); *H04W 28/048* (2013.01); *H04L 5/0016* (2013.01); *H04W 88/06* (2013.01); *H04W 36/16* (2013.01); *H04W 48/16* (2013.01); *H04W 52/04* (2013.01); *H04W 84/18* (2013.01); *H04W 52/0229* (2013.01); *H04W 16/14* (2013.01); *H04W 36/24* (2013.01); *H04W 48/20* (2013.01)
USPC ............ 370/338; 455/434; 375/145; 370/254

(56) References Cited

U.S. PATENT DOCUMENTS

| | | | |
|---|---|---|---|
| 5,233,627 A | 8/1993 | Kozima et al. | |
| 5,535,425 A | 7/1996 | Watanabe | |
| 5,583,870 A | 12/1996 | Delprat et al. | |
| 5,701,589 A | 12/1997 | Lee et al. | |
| 5,726,893 A | 3/1998 | Schuchman et al. | |
| 5,754,542 A | 5/1998 | Ault et al. | |
| 5,805,575 A | 9/1998 | Kamin, Jr. | |
| 5,818,871 A | 10/1998 | Blakeney et al. | |
| 5,839,074 A | 11/1998 | Plehn | |
| 5,844,900 A | 12/1998 | Hong et al. | |
| 5,852,780 A | 12/1998 | Wang et al. | |
| 5,903,618 A | 5/1999 | Miyake | |
| 5,940,765 A | 8/1999 | Haartsen | |
| 5,953,323 A | 9/1999 | Haartsen | |
| 5,991,639 A | 11/1999 | Rautiola et al. | |
| 5,995,500 A | 11/1999 | Ma | |
| 5,995,844 A | 11/1999 | Fukuda | |
| 6,011,515 A | 1/2000 | Radcliffe et al. | |
| 6,047,178 A | 4/2000 | Frlan | |
| 6,175,747 B1 | 1/2001 | Tanishima et al. | |
| 6,230,012 B1 | 5/2001 | Willkie et al. | |
| 6,377,608 B1 | 4/2002 | Zyren | |
| 6,389,062 B1 | 5/2002 | Wu | |
| 6,473,418 B1 | 10/2002 | Laroia et al. | |
| 6,545,997 B1 | 4/2003 | Bohnke et al. | |
| 6,574,266 B1 | 6/2003 | Haartsen | |
| 6,580,981 B1 | 6/2003 | Masood et al. | |
| 6,609,010 B1 | 8/2003 | Dolle et al. | |
| 6,611,507 B1 | 8/2003 | Hottinen et al. | |
| 6,614,769 B1 | 9/2003 | Erlick et al. | |
| 6,650,629 B1 | 11/2003 | Takahashi et al. | |
| 6,671,525 B2 | 12/2003 | Allen et al. | |
| 6,725,058 B2 | 4/2004 | Rinne et al. | |
| 6,728,232 B2 | 4/2004 | Hasty, Jr. et al. | |
| 6,735,448 B1 | 5/2004 | Krishnamurthy et al. | |
| 6,741,836 B2 | 5/2004 | Lee et al. | |
| 6,744,743 B2 | 6/2004 | Walton et al. | |
| 6,760,599 B1 | 7/2004 | Uhlik | |
| 6,763,013 B2 | 7/2004 | Kennedy | |
| 6,771,963 B1 | 8/2004 | Cheng et al. | |
| 6,859,463 B1 * | 2/2005 | Mayor et al. .................. | 370/445 |
| 6,882,632 B1 | 4/2005 | Koo et al. | |
| 6,882,851 B2 | 4/2005 | Sugar et al. | |
| 6,920,171 B2 | 7/2005 | Souissi et al. | |
| 6,922,388 B1 | 7/2005 | Laroia et al. | |
| 6,934,299 B2 | 8/2005 | Kaatz | |
| 6,940,827 B2 | 9/2005 | Li et al. | |
| 6,940,843 B2 | 9/2005 | Goodall et al. | |
| 6,961,364 B1 | 11/2005 | Laroia et al. | |
| 6,975,600 B1 | 12/2005 | Vaughan et al. | |
| 6,975,855 B1 | 12/2005 | Wallenius | |
| 6,982,987 B2 | 1/2006 | Cain | |
| 6,985,087 B2 | 1/2006 | Soliman | |
| 6,990,087 B2 | 1/2006 | Rao et al. | |
| 7,006,451 B2 | 2/2006 | Kuwahara | |
| 7,013,145 B1 | 3/2006 | Centore, III | |
| 7,016,649 B1 | 3/2006 | Narasimhan et al. | |
| 7,019,616 B2 | 3/2006 | Fernandez | |
| 7,027,409 B2 | 4/2006 | Cain | |
| 7,035,221 B2 | 4/2006 | Furukawa et al. | |
| 7,039,372 B1 * | 5/2006 | Sorrells et al. ................ | 455/118 |
| 7,072,650 B2 | 7/2006 | Stanforth | |
| 7,092,391 B2 | 8/2006 | Umeda | |
| 7,130,368 B1 | 10/2006 | Aweya et al. | |
| 7,133,697 B2 | 11/2006 | Judd et al. | |
| 7,136,655 B2 | 11/2006 | Skafidas et al. | |
| 7,146,130 B2 | 12/2006 | Hsu et al. | |
| 7,149,201 B2 | 12/2006 | Hunzinger | |
| 7,164,885 B2 | 1/2007 | Jonsson et al. | |
| 7,167,463 B2 | 1/2007 | Alapuranen | |
| 7,174,187 B1 | 2/2007 | Ngan | |
| 7,180,884 B2 | 2/2007 | Elliott et al. | |
| 7,218,689 B2 | 5/2007 | Gupta | |
| 7,224,954 B2 | 5/2007 | Okajima et al. | |
| 7,228,138 B2 | 6/2007 | Hansson et al. | |
| 7,233,602 B2 | 6/2007 | Chen et al. | |
| 7,246,235 B2 | 7/2007 | Ellison et al. | |
| 7,248,570 B2 | 7/2007 | Bahl et al. | |
| 7,260,399 B1 | 8/2007 | Oh et al. | |
| 7,269,169 B1 | 9/2007 | Venkataraman et al. | |
| 7,280,467 B2 | 10/2007 | Smee et al. | |
| 7,280,810 B2 | 10/2007 | Feher | |
| 7,313,628 B2 | 12/2007 | Chaskar et al. | |
| 7,333,829 B2 | 2/2008 | Malone et al. | |
| 7,336,626 B1 | 2/2008 | Barratt et al. | |
| 7,336,927 B2 | 2/2008 | Diaz Cervera et al. | |
| 7,339,883 B2 | 3/2008 | Santhoff et al. | |
| 7,342,834 B2 | 3/2008 | Ishibashi | |
| 7,342,896 B2 | 3/2008 | Ayyagari | |
| 7,342,900 B2 | 3/2008 | Xiong et al. | |
| 7,352,733 B2 | 4/2008 | Green | |
| 7,366,200 B2 | 4/2008 | Laroia et al. | |
| 7,378,953 B2 | 5/2008 | Coronel et al. | |
| 7,388,845 B2 | 6/2008 | Laroia et al. | |
| 7,388,857 B2 | 6/2008 | Sharma | |
| 7,401,224 B2 | 7/2008 | Gantman et al. | |
| 7,426,396 B2 | 9/2008 | Iwasaki et al. | |
| 7,440,754 B2 | 10/2008 | Bahl et al. | |

(56) References Cited

U.S. PATENT DOCUMENTS

| | | |
|---|---|---|
| 7,457,646 B2 | 11/2008 | Mahany et al. |
| 7,477,897 B2 | 1/2009 | Bye |
| 7,493,149 B1 | 2/2009 | Doyle et al. |
| 7,499,418 B2 | 3/2009 | Oprescu-Surcobe et al. |
| 7,502,341 B2 | 3/2009 | Matoba et al. |
| 7,512,096 B2 | 3/2009 | Kuzminskiy et al. |
| 7,545,771 B2 | 6/2009 | Wentink et al. |
| 7,548,758 B2 | 6/2009 | Periyalwar et al. |
| 7,570,627 B2 | 8/2009 | Welborn et al. |
| 7,570,969 B2 | 8/2009 | Hwang et al. |
| 7,586,881 B2 | 9/2009 | Hansen et al. |
| 7,590,183 B2 * | 9/2009 | Yonge et al. ............ 375/260 |
| 7,613,426 B2 | 11/2009 | Kuehnel et al. |
| 7,626,975 B2 | 12/2009 | Colban et al. |
| 7,653,011 B2 | 1/2010 | Rahman et al. |
| 7,660,595 B2 | 2/2010 | Ramaswamy et al. |
| 7,664,055 B2 | 2/2010 | Nelson |
| 7,664,130 B2 | 2/2010 | Sakoda et al. |
| 7,720,029 B2 | 5/2010 | Orava et al. |
| 7,720,172 B2 | 5/2010 | Nakagawa et al. |
| 7,724,713 B2 | 5/2010 | Del Prado Pavon et al. |
| 7,729,240 B1 | 6/2010 | Crane et al. |
| 7,756,521 B2 | 7/2010 | Gerlach et al. |
| 7,925,010 B2 | 4/2011 | Sannino et al. |
| 8,498,237 B2 | 7/2013 | Corson et al. |
| 8,504,099 B2 | 8/2013 | Corson et al. |
| 8,554,226 B2 | 10/2013 | Laroia et al. |
| 2001/0055980 A1 | 12/2001 | Sato |
| 2002/0105970 A1 | 8/2002 | Shvodian |
| 2002/0128049 A1 | 9/2002 | Davis |
| 2002/0131121 A1 | 9/2002 | Jeganathan et al. |
| 2002/0131386 A1 | 9/2002 | Gwon |
| 2002/0193945 A1 | 12/2002 | Tan et al. |
| 2002/0196771 A1 | 12/2002 | Vij et al. |
| 2002/0196844 A1 | 12/2002 | Rafie et al. |
| 2003/0002482 A1 | 1/2003 | Kubler et al. |
| 2003/0007473 A1 | 1/2003 | Strong et al. |
| 2003/0012188 A1 | 1/2003 | Zelig et al. |
| 2003/0054818 A1 | 3/2003 | Bahl |
| 2003/0063655 A1 | 4/2003 | Young |
| 2003/0069035 A1 | 4/2003 | Shurvinton |
| 2003/0078031 A1 | 4/2003 | Masuda |
| 2003/0078037 A1 | 4/2003 | Auckland et al. |
| 2003/0108016 A1 | 6/2003 | Bonta |
| 2003/0128659 A1 | 7/2003 | Hirsch |
| 2003/0142631 A1 | 7/2003 | Silvester |
| 2003/0145064 A1 | 7/2003 | Hsu et al. |
| 2003/0169697 A1 | 9/2003 | Suzuki et al. |
| 2003/0217266 A1 | 11/2003 | Epp et al. |
| 2004/0005904 A1 | 1/2004 | Wolf et al. |
| 2004/0008661 A1 | 1/2004 | Myles |
| 2004/0009781 A1 | 1/2004 | Andrews et al. |
| 2004/0028003 A1 | 2/2004 | Diener |
| 2004/0032536 A1 | 2/2004 | Islam et al. |
| 2004/0047324 A1 | 3/2004 | Diener |
| 2004/0057400 A1 | 3/2004 | Walsh et al. |
| 2004/0063458 A1 | 4/2004 | Hori |
| 2004/0064568 A1 | 4/2004 | Akhil |
| 2004/0067773 A1 | 4/2004 | Rachabathuni et al. |
| 2004/0072558 A1 | 4/2004 | Van Bosch |
| 2004/0077346 A1 | 4/2004 | Krenik et al. |
| 2004/0077366 A1 | 4/2004 | Panasik et al. |
| 2004/0081117 A1 | 4/2004 | Malek et al. |
| 2004/0082326 A1 | 4/2004 | Shaw et al. |
| 2004/0082356 A1 * | 4/2004 | Walton et al. ............ 455/522 |
| 2004/0090924 A1 | 5/2004 | Giaimo |
| 2004/0095902 A1 | 5/2004 | Laroia et al. |
| 2004/0095904 A1 | 5/2004 | Laroia et al. |
| 2004/0106401 A1 | 6/2004 | Ormson |
| 2004/0114521 A1 | 6/2004 | Sugaya |
| 2004/0125776 A1 | 7/2004 | Haugli et al. |
| 2004/0125778 A1 | 7/2004 | Lin et al. |
| 2004/0127204 A1 | 7/2004 | Belmont |
| 2004/0127214 A1 | 7/2004 | Gautam |
| 2004/0127240 A1 | 7/2004 | Li |
| 2004/0133689 A1 | 7/2004 | Vasisht |
| 2004/0145604 A1 | 7/2004 | Min |
| 2004/0147223 A1 | 7/2004 | Cho |
| 2004/0152464 A1 | 8/2004 | Sugaya |
| 2004/0162871 A1 | 8/2004 | Pabla et al. |
| 2004/0165563 A1 | 8/2004 | Hsu et al. |
| 2004/0176059 A1 | 9/2004 | Hayem et al. |
| 2004/0190483 A1 | 9/2004 | Shahaf et al. |
| 2004/0203762 A1 | 10/2004 | Liu et al. |
| 2004/0204850 A1 | 10/2004 | MacNeille |
| 2004/0240401 A1 | 12/2004 | Willenegger et al. |
| 2004/0240405 A1 | 12/2004 | Okazaki |
| 2004/0240476 A1 | 12/2004 | Joshi |
| 2004/0249448 A1 | 12/2004 | Gault |
| 2004/0258006 A1 | 12/2004 | An |
| 2004/0259529 A1 | 12/2004 | Suzuki |
| 2005/0009578 A1 | 1/2005 | Liu |
| 2005/0025092 A1 | 2/2005 | Morioka |
| 2005/0037754 A1 | 2/2005 | Liu et al. |
| 2005/0058102 A1 | 3/2005 | Santhoff et al. |
| 2005/0058117 A1 | 3/2005 | Morioka et al. |
| 2005/0058229 A1 | 3/2005 | Alagha |
| 2005/0060535 A1 | 3/2005 | Bartas |
| 2005/0063344 A1 | 3/2005 | Winzell |
| 2005/0063416 A1 | 3/2005 | Shin et al. |
| 2005/0068934 A1 | 3/2005 | Sakoda |
| 2005/0075118 A1 | 4/2005 | Lewis et al. |
| 2005/0085190 A1 | 4/2005 | Nishikawa |
| 2005/0085214 A1 | 4/2005 | Laroia |
| 2005/0088980 A1 | 4/2005 | Olkkonen et al. |
| 2005/0090266 A1 | 4/2005 | Sheynblat |
| 2005/0105491 A1 | 5/2005 | Chaskar et al. |
| 2005/0111397 A1 | 5/2005 | Attar et al. |
| 2005/0117525 A1 | 6/2005 | Poustchi |
| 2005/0117530 A1 | 6/2005 | Abraham |
| 2005/0128991 A1 | 6/2005 | Dayanandan et al. |
| 2005/0129221 A1 | 6/2005 | Dickens et al. |
| 2005/0135295 A1 | 6/2005 | Walton |
| 2005/0143119 A1 | 6/2005 | Chandra et al. |
| 2005/0152280 A1 | 7/2005 | Pollin et al. |
| 2005/0153736 A1 | 7/2005 | Ganton |
| 2005/0157660 A1 | 7/2005 | Mandato et al. |
| 2005/0176371 A1 | 8/2005 | Palin et al. |
| 2005/0177639 A1 | 8/2005 | Reunamaki |
| 2005/0185628 A1 | 8/2005 | Watanabe et al. |
| 2005/0185669 A1 | 8/2005 | Welborn et al. |
| 2005/0201308 A1 | 9/2005 | Sekiya et al. |
| 2005/0210157 A1 | 9/2005 | Sakoda |
| 2005/0220201 A1 | 10/2005 | Laroia et al. |
| 2005/0226175 A1 | 10/2005 | Gupta |
| 2005/0227692 A1 | 10/2005 | Kawashima et al. |
| 2005/0227698 A1 | 10/2005 | Nonin et al. |
| 2005/0233742 A1 | 10/2005 | Karaoguz et al. |
| 2005/0233746 A1 | 10/2005 | Laroia et al. |
| 2005/0238083 A1 | 10/2005 | Laroia et al. |
| 2005/0250469 A1 | 11/2005 | Laroia et al. |
| 2005/0254435 A1 | 11/2005 | Moakley et al. |
| 2005/0265218 A1 | 12/2005 | Molisch et al. |
| 2005/0265221 A1 | 12/2005 | Batra et al. |
| 2005/0276243 A1 | 12/2005 | Sugaya et al. |
| 2005/0281320 A1 | 12/2005 | Neugebauer |
| 2005/0286477 A1 | 12/2005 | Gupta et al. |
| 2006/0013160 A1 | 1/2006 | Haartsen |
| 2006/0014542 A1 | 1/2006 | Khandekar et al. |
| 2006/0019660 A1 | 1/2006 | Li |
| 2006/0020556 A1 | 1/2006 | Hamnen |
| 2006/0023686 A1 | 2/2006 | Jeong et al. |
| 2006/0025151 A1 | 2/2006 | Karaoguz et al. |
| 2006/0031583 A1 | 2/2006 | Fujii et al. |
| 2006/0034315 A1 * | 2/2006 | Maekawa et al. ............ 370/432 |
| 2006/0039332 A1 | 2/2006 | Kotzin |
| 2006/0046728 A1 | 3/2006 | Jung et al. |
| 2006/0058059 A1 | 3/2006 | Kim |
| 2006/0073847 A1 | 4/2006 | Pirzada et al. |
| 2006/0083199 A1 | 4/2006 | Yang |
| 2006/0088010 A1 | 4/2006 | Buchwald et al. |
| 2006/0089099 A1 | 4/2006 | Buchwald et al. |
| 2006/0094456 A1 | 5/2006 | Rittle et al. |
| 2006/0105741 A1 | 5/2006 | Suh et al. |

(56) References Cited

U.S. PATENT DOCUMENTS

| | | |
|---|---|---|
| 2006/0111104 A1 | 5/2006 | Hyslop |
| 2006/0114853 A1 | 6/2006 | Hasty, Jr. et al. |
| 2006/0116113 A1 | 6/2006 | Gass |
| 2006/0116877 A1 | 6/2006 | Pickering et al. |
| 2006/0178131 A1 | 8/2006 | Huotari et al. |
| 2006/0203789 A1 | 9/2006 | Iacono et al. |
| 2006/0215611 A1 | 9/2006 | Nakagawa et al. |
| 2006/0223511 A1 | 10/2006 | Hagale et al. |
| 2006/0223574 A1 | 10/2006 | Chandra |
| 2006/0233125 A1 | 10/2006 | Pajukoski et al. |
| 2006/0251017 A1 | 11/2006 | Bishop |
| 2006/0253736 A1 | 11/2006 | Rudolf et al. |
| 2007/0019717 A1 | 1/2007 | Laroia et al. |
| 2007/0054624 A1 | 3/2007 | Kashiwagi |
| 2007/0064742 A1 | 3/2007 | Shvodian |
| 2007/0066360 A1 | 3/2007 | Sato et al. |
| 2007/0070179 A1 | 3/2007 | Van Rooyen |
| 2007/0086424 A1 | 4/2007 | Calcev et al. |
| 2007/0097922 A1 | 5/2007 | Parekh et al. |
| 2007/0100222 A1 | 5/2007 | Mastrototaro et al. |
| 2007/0104138 A1 | 5/2007 | Rudolf et al. |
| 2007/0111734 A1 | 5/2007 | Beppu et al. |
| 2007/0136459 A1 | 6/2007 | Roche et al. |
| 2007/0142084 A1 | 6/2007 | Van Niekerk et al. |
| 2007/0153729 A1 | 7/2007 | Alapuranen |
| 2007/0160016 A1 | 7/2007 | Jain |
| 2007/0165589 A1 | 7/2007 | Sakoda |
| 2007/0201423 A1 | 8/2007 | Laroia et al. |
| 2007/0206554 A1 | 9/2007 | Laroia et al. |
| 2007/0211677 A1 | 9/2007 | Laroia et al. |
| 2007/0211678 A1 | 9/2007 | Li et al. |
| 2007/0211679 A1 | 9/2007 | Laroia et al. |
| 2007/0211680 A1 | 9/2007 | Laroia et al. |
| 2007/0213046 A1 | 9/2007 | Li et al. |
| 2007/0247365 A1 | 10/2007 | Laroia et al. |
| 2007/0254596 A1 | 11/2007 | Corson et al. |
| 2007/0255960 A1 | 11/2007 | Hon et al. |
| 2007/0270190 A1 | 11/2007 | Hisky et al. |
| 2007/0274275 A1 | 11/2007 | Laroia et al. |
| 2007/0274276 A1 | 11/2007 | Laroia et al. |
| 2007/0286111 A1 | 12/2007 | Corson et al. |
| 2007/0291714 A1 | 12/2007 | Laroia et al. |
| 2007/0291715 A1 | 12/2007 | Laroia et al. |
| 2008/0002648 A1 | 1/2008 | Laroia et al. |
| 2008/0013519 A1 | 1/2008 | Kwon et al. |
| 2008/0031193 A1 | 2/2008 | Laroia et al. |
| 2008/0037487 A1 | 2/2008 | Li et al. |
| 2008/0039066 A1 | 2/2008 | Laroia et al. |
| 2008/0043656 A1 | 2/2008 | Yoon et al. |
| 2008/0069072 A1 | 3/2008 | Callaway et al. |
| 2008/0075033 A1* | 3/2008 | Shattil ............................ 370/328 |
| 2008/0112334 A1 | 5/2008 | Laroia et al. |
| 2008/0123600 A1 | 5/2008 | Fodor |
| 2008/0212651 A1 | 9/2008 | Santhoff et al. |
| 2008/0212771 A1 | 9/2008 | Hauser |
| 2008/0318612 A1 | 12/2008 | Axnas et al. |
| 2009/0017858 A1 | 1/2009 | Kwon et al. |
| 2009/0040996 A1 | 2/2009 | Laroia et al. |
| 2009/0059841 A1 | 3/2009 | Laroia et al. |
| 2009/0092075 A1 | 4/2009 | Corson et al. |
| 2009/0190558 A1 | 7/2009 | Strutt et al. |
| 2009/0282253 A1 | 11/2009 | Rose et al. |
| 2009/0296669 A1 | 12/2009 | Uchiyama et al. |
| 2010/0128652 A1 | 5/2010 | Lee et al. |
| 2013/0343283 A1 | 12/2013 | Laroia |

FOREIGN PATENT DOCUMENTS

| | | |
|---|---|---|
| CN | 1371583 A | 9/2002 |
| CN | 1397117 A | 2/2003 |
| CN | 1411237 | 4/2003 |
| CN | 1578314 A | 2/2005 |
| CN | 1596005 A | 3/2005 |
| CN | 1650594 A | 8/2005 |
| CN | 1663156 | 8/2005 |
| CN | 1689345 A | 10/2005 |
| CN | 1909386 A | 2/2007 |
| EP | 0469659 A1 | 2/1992 |
| EP | 0776134 | 5/1997 |
| EP | 0848567 A1 | 6/1998 |
| EP | 0969602 A1 | 1/2000 |
| EP | 1089586 A1 | 4/2001 |
| EP | 1119137 A1 | 7/2001 |
| EP | 1241838 A2 | 9/2002 |
| EP | 1326386 A1 | 7/2003 |
| EP | 1408651 A1 | 4/2004 |
| EP | 1469659 A1 | 10/2004 |
| EP | 1496668 | 1/2005 |
| EP | 1549094 A1 | 6/2005 |
| EP | 1562333 | 8/2005 |
| EP | 1566944 | 8/2005 |
| EP | 1592176 | 11/2005 |
| EP | 1670183 A1 | 6/2006 |
| EP | 1895714 | 3/2008 |
| EP | 2312885 A1 | 4/2011 |
| GB | 232251 A1 | 3/1926 |
| GB | 2375014 A1 | 10/2002 |
| GB | 2410653 A | 8/2005 |
| JP | 7023465 | 1/1995 |
| JP | 07143567 | 6/1995 |
| JP | 8307934 A | 11/1996 |
| JP | 9107583 | 4/1997 |
| JP | 10013324 | 1/1998 |
| JP | 11289583 A | 10/1999 |
| JP | 11355291 | 12/1999 |
| JP | 2001069060 A | 3/2001 |
| JP | 2001069557 A | 3/2001 |
| JP | 2001118191 A | 4/2001 |
| JP | 2001257657 | 9/2001 |
| JP | 2001358694 A | 12/2001 |
| JP | 2002502164 A | 1/2002 |
| JP | 2002112347 | 4/2002 |
| JP | 2002208891 A | 7/2002 |
| JP | 2002223470 | 8/2002 |
| JP | 2002232337 A | 8/2002 |
| JP | 2002325281 A | 11/2002 |
| JP | 2002344458 A | 11/2002 |
| JP | 2003503920 | 1/2003 |
| JP | 2003143644 A | 5/2003 |
| JP | 2003158525 A | 5/2003 |
| JP | 2003249939 A | 9/2003 |
| JP | 2003258703 A | 9/2003 |
| JP | 2003348636 A | 12/2003 |
| JP | 2004032462 A | 1/2004 |
| JP | 2004053510 A | 2/2004 |
| JP | 2004128785 A | 4/2004 |
| JP | 2004146883 A | 5/2004 |
| JP | 2004147015 A | 5/2004 |
| JP | 2004180297 A | 6/2004 |
| JP | 2004242187 A | 8/2004 |
| JP | 2004247820 A | 9/2004 |
| JP | 2004254254 A | 9/2004 |
| JP | 2004260258 A | 9/2004 |
| JP | 2004260748 A | 9/2004 |
| JP | 2004336351 A | 11/2004 |
| JP | 2004533762 A | 11/2004 |
| JP | 2004349777 A | 12/2004 |
| JP | 2004350168 A | 12/2004 |
| JP | 2004363877 A | 12/2004 |
| JP | 2005033808 A | 2/2005 |
| JP | 2005045368 | 2/2005 |
| JP | 2005065101 A | 3/2005 |
| JP | 2005072910 A | 3/2005 |
| JP | 2005086234 A | 3/2005 |
| JP | 2005086408 | 3/2005 |
| JP | 2005124121 A | 5/2005 |
| JP | 2005136529 A | 5/2005 |
| JP | 2005151525 A | 6/2005 |
| JP | 2005167502 A | 6/2005 |
| JP | 2005210703 A | 8/2005 |
| JP | 2005223722 A | 8/2005 |
| JP | 2005223767 A | 8/2005 |
| JP | 2005523616 A | 8/2005 |

(56) References Cited

FOREIGN PATENT DOCUMENTS

| | | |
|---|---|---|
| JP | 2005236819 A | 9/2005 |
| JP | 2005244698 A | 9/2005 |
| JP | 2005252645 A | 9/2005 |
| JP | 2005253038 A | 9/2005 |
| JP | 2005253047 A | 9/2005 |
| JP | 2005277599 A | 10/2005 |
| JP | 2005277815 A | 10/2005 |
| JP | 2005295400 | 10/2005 |
| JP | 2005328231 | 11/2005 |
| JP | 2005341592 A | 12/2005 |
| JP | 2005348203 | 12/2005 |
| JP | 2005354326 A | 12/2005 |
| JP | 2005537762 T | 12/2005 |
| JP | 2006005792 A | 1/2006 |
| JP | 2006501777 A | 1/2006 |
| JP | 2007509531 A | 4/2007 |
| JP | 2007525891 A | 9/2007 |
| JP | 2007533256 | 11/2007 |
| JP | 2008507219 T | 3/2008 |
| JP | 2008228128 A | 9/2008 |
| JP | 2009523379 | 6/2009 |
| JP | 4927869 | 2/2012 |
| KR | 960012088 B1 | 9/1996 |
| KR | 100225765 B1 | 10/1999 |
| KR | 20000035806 A | 6/2000 |
| KR | 20000076038 | 12/2000 |
| KR | 10362135 | 11/2002 |
| KR | 20030024435 A | 3/2003 |
| TW | 540210 | 7/2003 |
| TW | 545006 B | 8/2003 |
| TW | I230525 B | 4/2005 |
| TW | I239782 | 9/2005 |
| TW | 286515 | 1/2006 |
| TW | I250742 | 3/2006 |
| TW | M292848 | 6/2006 |
| WO | WO9701256 A1 | 1/1997 |
| WO | WO9749258 A1 | 12/1997 |
| WO | WO9808321 | 2/1998 |
| WO | 9839938 A2 | 9/1998 |
| WO | WO0074429 | 12/2000 |
| WO | WO0101717 A1 | 1/2001 |
| WO | 0192992 A2 | 12/2001 |
| WO | 0223758 | 3/2002 |
| WO | WO0249387 A1 | 6/2002 |
| WO | 02078271 A1 | 10/2002 |
| WO | 02082742 A1 | 10/2002 |
| WO | WO-02091623 A1 | 11/2002 |
| WO | WO03001742 | 1/2003 |
| WO | 03017596 A2 | 2/2003 |
| WO | 03039054 | 5/2003 |
| WO | WO-03039064 A1 | 5/2003 |
| WO | WO03090037 A2 | 10/2003 |
| WO | 2004012464 A2 | 2/2004 |
| WO | 2004019529 A2 | 3/2004 |
| WO | WO2004023241 A2 | 3/2004 |
| WO | 2004032536 A2 | 4/2004 |
| WO | WO2004047348 A1 | 6/2004 |
| WO | WO2004066646 A1 | 8/2004 |
| WO | WO2004071022 A1 | 8/2004 |
| WO | 2004080103 A1 | 9/2004 |
| WO | WO2004077920 A2 | 9/2004 |
| WO | WO2005013529 A2 | 2/2005 |
| WO | 2005022846 A1 | 3/2005 |
| WO | WO2005020517 | 3/2005 |
| WO | WO2005027556 A1 | 3/2005 |
| WO | 2005038606 A2 | 4/2005 |
| WO | 2005039105 A1 | 4/2005 |
| WO | WO2005034433 A1 | 4/2005 |
| WO | WO2005039128 | 4/2005 |
| WO | 2005053346 A1 | 6/2005 |
| WO | 2005053347 A1 | 6/2005 |
| WO | WO2005053253 | 6/2005 |
| WO | WO2005055527 | 6/2005 |
| WO | WO2005060209 A1 | 6/2005 |
| WO | WO2005062552 A1 | 7/2005 |
| WO | 2005071998 A1 | 8/2005 |
| WO | 2005076543 A1 | 8/2005 |
| WO | WO2005079012 A1 | 8/2005 |
| WO | 2005109657 A1 | 11/2005 |
| WO | WO2005109916 | 11/2005 |
| WO | WO2005109917 A1 | 11/2005 |
| WO | 2005117463 A1 | 12/2005 |
| WO | WO2005119478 | 12/2005 |
| WO | 2006000617 A1 | 1/2006 |
| WO | 2006007946 A1 | 1/2006 |
| WO | WO-2006006138 A1 | 1/2006 |
| WO | WO2006057815 | 6/2006 |
| WO | WO2006138122 A2 | 12/2006 |
| WO | 2007038896 A2 | 4/2007 |
| WO | 2007082281 | 7/2007 |
| WO | WO2007082247 | 7/2007 |
| WO | WO2008014336 A2 | 1/2008 |
| WO | 2008020162 A2 | 2/2008 |
| WO | 2008072346 A1 | 6/2008 |

OTHER PUBLICATIONS

Written Opinion—PCT/US2007/060355, International Search Authority—European Patent Office—Jul. 23, 2007.

International Preliminary Report on Patentability—PCT/US2007/060355, International Search Authority—The International Buearu of WIPO—Geneva, Switzerland—Jul. 15, 2008.

Juels, A. et al.: "Client Puzzles: A Cryptographic Countermeasure Against Connection Depletion Attacks" Proceedings of NDSS. Networks and Distributed Security Systems, XX, XX, Feb. 3, 1999, pp. 151-165, XP002340691 paragraph [0001] paragraph [0003.

Waters, B. et al.: "New Client Puzzle Outsourcing Techniques for DoS Resistance" CSS'04, Oct. 29, 2004, pp. 1-11, XP002538930 Washington, DC, USA abstract paragraph [01.2].

Hung-Yu Wei, Richard D. Gitlin; Incentive Scheduling for Cooperative Relay in WWAN/WLAN Two-Hop-Relay Network; IEEE Communications Society/ WCNC 2005; pp. 1696-1701.

Carlos Cordeiro, Kiran Challapali, Dagnachew Birru, Sai Shankar; IEEE 802.22: The First Worldwide Wireless Standard Based on Cognitive Radios; 2005 IEEE ; pp. 328-337 : XP-10855130A.

Ylianttila et al: "Geolocation Information and Inter-Technology Handoff" ICC 2000. 2000 IEEE International Conference on Communications. Conference Record. New Orleans, LA, Jun. 18-22, 2000, pp. 1573-1577,—XP-001208676.

Brandes S et al: "Reduction of Out-Of-Band Radiation in OFDM Based Overlay Systems" New Frontiers in Dynamic Spectrum Access Networks, 2005. DYSPAN 2005. 2005 First IEEE International Symposium on Baltimore, MD, USA Nov. 8-11, 2005, Piscataway, NJ, USA,IEEE, (Nov. 8, 2005), pp. 662-665, XP010855171 ISBN: 1-4244-0013-9.

Taiwanese Search report—096101116—TIPO—Aug. 26, 2010.

IEEE Computer Society, Part 15.4: Wireless Medium Access Control (MAC) and Physical Layer (PHY) Specifications for Low-Rate Wireless Personal Area Network (LRWPANs), IEEE Std 802. 15. 4 (TM)—2003, The United States of America, IEEE, Oct. 1, 2003, pp. 13 to 21, 45 to 47, 111 to 120, and 147 to 153.

IEEE Computer Society, Part 15.3: Wireless Medium Access Control (MAC) and Physical Layer (PHY) Specifications for High Rate Wireless Personal Area Networks (WPANs), IEEE Std 802. 15. 3 (TM)—2003, The United States of America, IEEE, Sep. 29, 2003, pp. 164 and 165.

IEEE, Part 15.3: Wireless Medium Access Control (MAC) and Physical Layer (PHY) Specifications for High Rate Wireless Personal Area Networks (WPANs), 802.15.3, the United States of America, IEEE, Sep. 29, 2003, IEEE Std 802. 15. Mar. 2003, pp. 8 to 16, 108 to 111, 116 to 117, 170 to 171, and 204 to 206.

Wada, Y. et al., "Consideration of OFDM Cellular System Using Single Band", IEICE Year 2002 Communication Society Convention Lecture Papers 1, Aug. 20, 2002, p. 355, B-5-58.

Yanchao Zhang, Wei Liu, Wenjing Lou, Yuguang Fang; Anonymous Handshakes in Mobile AD HOC Networks; Milcom 2004—2004 IEEE Military Communications Conference; pp. 1193-1199; XP-002432989.

(56) References Cited

OTHER PUBLICATIONS

Hung-Yu Wei, Richard D. Gitlin; Incentive Scheduling for Cooperative Relay in WWAN/WLAN Two-Hop-Relay Network; IEEE Communications Society/WCNC 2005; pp. 1696-1701.

Niels Hoven, Anant Sahai; Power Scaling for Cognitive Radio; 2005 International Conference on Wireless Networks, Communications and Mobile Computing; pp. 250-255.

Jose Costa-Requena, Raimo Kantola, Nicklas Beijar; Incentive, 2005.

Carlos Cordeiro, Kiran Challapali, Dagnachew Birru, Sai Shankar; IEEE 802.22: The First Worldwide Wireless Standard Based on Cognitive Radios; 2005 IEEE; pp. 328-337: XP-10855130A.

Cabric D et al: "Implementation Issues in Spectrum Sensing for Cognitive Radios" Signals, Systems and Computers, 2004. Conference Record of the Thirty-Eighth Asilomar Conference on Pacific Grove, CA Nov. 7-10, 2004 pp. 772-776 XP-010781056.

Ylianttila et al: "Geolocation Information and Inter-Technology Handoff" ICC 2000. 2000 IEEE International Conference on Communications. Conference Record. New Orleans, LA, Jun. 18-22, 2000, pp. 1573-1577,-XP-001208676.

Spyridon Panagiotakis et al: "Intelligent Service Mediation for Supporting Advanced Location and Mobility—Aware Service Provisioning in Reconfigurable Mobile Networks" IEEE Personal Communications, Oct. 2002 pp. 28-38, XP-011093874.

Dagres et al., "Flexible Radio: A General Framework With Phy-Layer Algorithm-Design Insights" Eurocon 2005, Nov. 22-24, 2005 pp. 120-123, XP-10916036.

Van de Beek, "ML Estimation of Time and Frequency Offset in OFDM Systems" IEEE Transactions on Signal Processing, vol. 45 No. 7 Jul. 1997, XP-11057861.

Brandes S et al: "Reduction of Out-Of-Band Radiation in OFDM Based Overlay Systems" New Frontiers in Dynamic Spectrum Access Networks, 2005. Dyspan 2005. 2005 First IEEE International Symposium on Baltimore, MD, USA Nov. 8-11, 2005, Piscataway, NJ, USA, IEEE, (Nov. 8, 2005), pp. 662-665, XP010855171 ISBN: 1-4244-0013-9.

Hlavacs H., et al., "Enhancing ZRTP by using Computational Puzzles", Journal of Universal Computer Science, vol. 14 No. 5, Feb. 28, 2008, pp. 693-716.

Kim S., et al., "Reliable transfer on wireless sensor networks", 2004. IEEE SECON 2004—IEEE, pp. 449-459.

Feng W et al., "Design and implementation of network puzzles", INFOCOM 2005 Proceedings IEEE 24th Annual Joint Conference of the IEEE Computer and Communications Societies Mar. 2005, pp. 2372-2382, vol. 4.

\* cited by examiner

CHOOSING PARAMETERS IN A PEER-TO-PEER COMMUNICATIONS SYSTEM

CROSS-REFERENCE TO RELATED APPLICATIONS

This application claims the benefit of U.S. Provisional Patent application Ser. No. 60/758,010 entitled "METHODS AND APPARATUS FOR FACILITATING IDENTIFICATION, SYNCHRONIZATION OR ACQUSITION USING BEACON SIGNALS" which was filed Jan. 11, 2006; U.S. Provisional Patent application Ser. No. 60/758,011 entitled "METHODS AND APPARATUS FOR USING BEACON SIGNALS FOR IDENTIFICATION, SYNCHRONIZATION OR ACQUSITION IN AN AD HOC WIRELESS NETWORK" which was filed Jan. 11, 2006; U.S. Provisional Patent application Ser. No. 60/758,012 entitled "METHODS ABD APPARATUS FOR USING BEACON SIGNALS IN A COGNITIVE RADIO NETWORK" which was filed Jan. 11, 2006; U.S. Provisional Patent application Ser. No. 60/845,052 entitled "POWER ALLOCATION SCHEME" which was filed Sep. 15, 2006; U.S. Provisional Patent application Ser. No. 60/845,051 entitled "BEACONS IN A MIXED WIRELESS COMMUNICATION SYSTEM" which was filed Sep. 15, 2006; and U.S. Provisional Patent application Ser. No. 60/863,304 entitled "BEACONS IN A MIXED COMMUNICATION SYSTEM" which was filed Oct. 27, 2006. The entireties of the aforementioned applications are herein incorporated by reference.

BACKGROUND

I. Field

The following description relates generally to wireless communications, and more particularly to identifying parameters for communication via a local area peer-to-peer network.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

According to another example, wireless communication systems oftentimes employ peer-to-peer or ad hoc architectures whereby a wireless terminal may transfer signals directly to another wireless terminal. As such, signals need not traverse through a base station; rather, wireless terminals within range of each other may discover and/or communicate directly. Peer-to-peer networks may leverage various portions of wireless spectrum for transferring data. However, wireless spectrum is an expensive and valuable resource. Moreover, conventional peer-to-peer networks typically communicate in an inefficient manner that yields wireless spectrum related waste.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating choosing of parameters to utilize in a local area peer-to-peer network. The parameters may relate to tone spacing cyclic prefix symbol time, and the like. Further the parameters may be a function of a state (e.g., peer discovery state, control related traffic state, data related traffic state, . . . ) associated with the local area peer-to-peer network. Moreover, the local area peer-to-peer network may share spectrum with a wide area network; as such, parameters for the peer-to-peer network may be selected based on the type of wide area network (e.g., air interface technology) and/or wide area network related parameters.

According to related aspects, a method that facilities selecting parameters in a local area peer-to-peer network is described herein. The method may comprise utilizing a first set of parameters for a first state in a peer-to-peer network. Further, the method may include utilizing a second set of parameters for a second state in the peer-to-peer network.

Another aspect relates to a wireless communications apparatus. The wireless communications apparatus may include a memory that retains instructions related to identifying a state associated with peer-to-peer communication and ascertaining a set of parameters to be used for the peer-to-peer communication as a function of the identified state. Further, the wireless communications apparatus may include a processor, coupled to the memory, configured to execute the instructions retained in the memory.

Yet another aspect relates to a wireless communications apparatus that enables communication over a local area peer-to-peer network. The wireless communications apparatus may include means for identifying a state associated with a peer-to-peer communication; means for accessing a set of parameters to be used for the peer-to-peer communication as a function of the state.

Still another aspect relates to a machine-readable medium having stored thereon machine-executable instructions fro determining a state of a peer-to-peer network, determining a type of wide area network that shares a common bandwidth with the peer-to-peer network and acquiring parameter data for use with the peer-to-peer network based on the state and the type of the wide area network.

In accordance with another aspect, an apparatus in a wireless communication system may include a processor, wherein the processor may be configured to determined a state associated with communications via a peer-to-peer network and obtain a set of parameters to be utilized for communicating via the peer-to-peer network as a function of the state.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
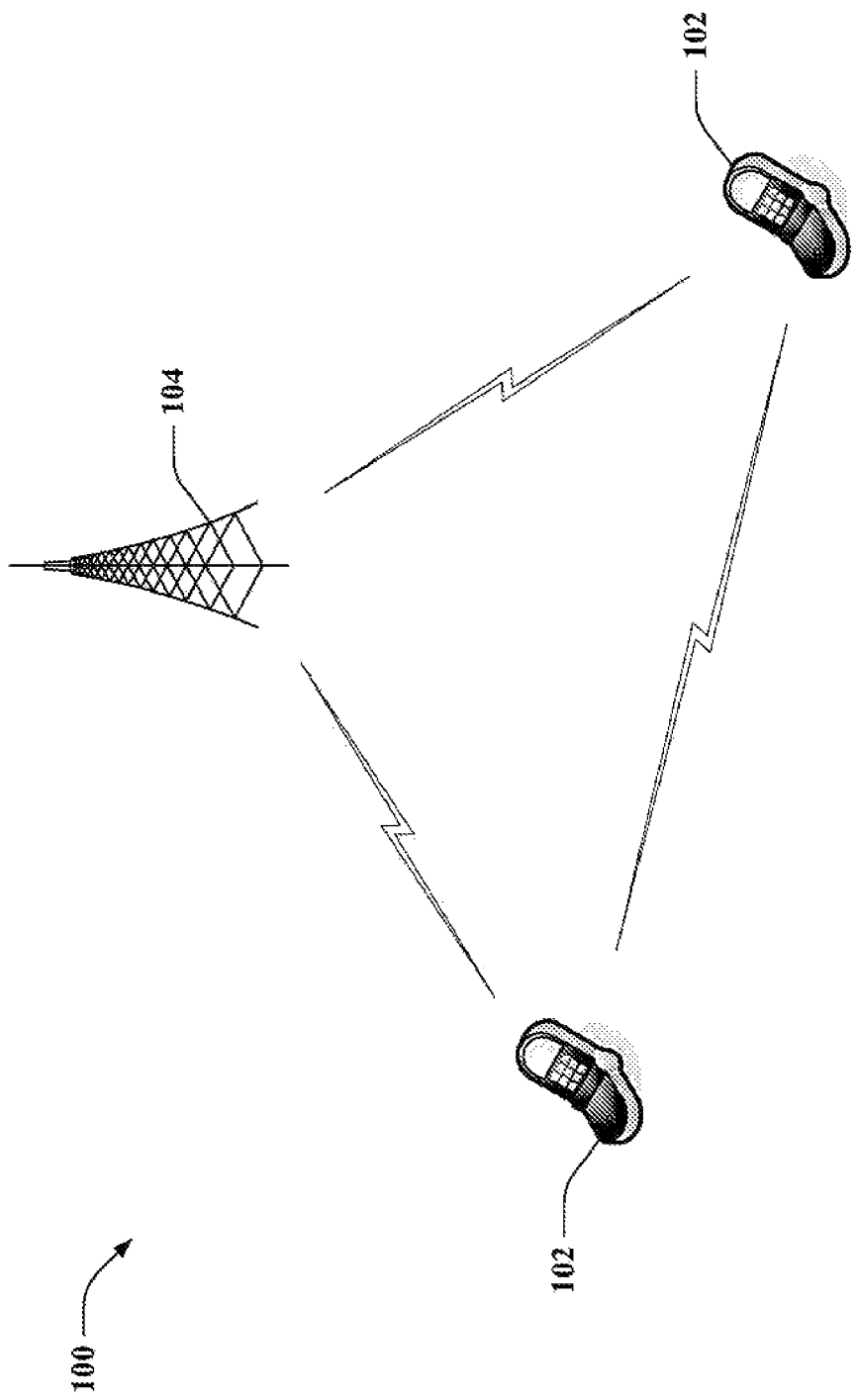
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being a process running on a processor, a processor, an object, an executable, a thread of execution, a program, and/or computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate be way of local and/or remote processes such as in accordance with a signal having one or more data packets (e.g., data from one component interacting with another component in a local system, distributed system, and/or across network such as Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device user agent, user device, or user, equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card stick, key drive, etc.). Additionally, various storage media described herein can represent one or more devices and/or machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 may comprise one or more wireless terminals 102. Although two wireless terminals 102 are depicted, it is to be appreciated that system 100 may include substantially any number of wireless terminals 102. Wireless terminals 102 can be, for example, cellular phones, smart phones, laptops, handheld communication devices, handheld computing devices, satellite radios, global positioning systems, PDAs, and/or any other suitable device for communicating over wireless communication system 100 . Wireless terminals 102 can communicate directly with each other via a local area peer-to-peer (P2P) network (e.g., ad hoc network). Peer-to-peer communication may be effectuated by directly transferring signals between wireless terminal 102; thus, the signals need not traverse through a base station (e.g., base station 104).

Further, system 100 may support a wide area network (WAN). System 100 may include a base station 104 (e.g., access point) and/or any number of disparate base stations (not shown) in one or more sectors that receive, transmit, repeat, etc. wireless communication signals to each other and/or to one or more wireless terminals 102. Base station 104 can comprise a transmitter chain and a receiver chain, each or which can in turn comprise a plurality of components associated with signal transmission and reception (e.g., processors, modulators, multiplexers, demodulators, demultiplexers, antennas, ...) as will be appreciated by one skilled in the art. Wireless terminal(s) 102 may transmit signals to and/or receive signals from base station 104 when communicating via the wide area infra-structure network supported by system 100.

Peer-to-Peer communication between wireless terminals 102 may be synchronous, and thus, wireless terminals 102 may have a common understanding of time. For instance, wireless terminals 102 may obtain timing signals from base station 104 (and/or a transmitter (not shown) that provides less functionally) utilized to synchronize operation of wireless terminals 102. Further, it is contemplated that each peer-to-peer network may set its own time. According to an example, wireless terminals 102 may effectuate peer discovery during a first period of time and send and/or receive traffic during a second period of time.

Wireless terminals 102 may identify a state during a period of time associated with peer-to-peer communication, where the state relates to the type of communication between wireless terminals 102 (e.g., peer discovery, traffic, paging, ...). Further, wireless terminals 102 may recognize sets of parameters to be utilized in connection with identified states. For instance, parameters may relate to tone spacing, symbol time, cyclic prefix, and so forth for an OFDM-based air interface technology, or CDMA chip rate for a CDMA-based air interface technology. Additionally, sets of parameters may be uniquely tailored to optimize performance of system 100 during differing states, thereby improving efficiency associated with system 100. For example, sets of parameters may be selected that manage/mitigate interference, increase spectrum reuse efficiency, mitigate overhead, and so forth.

The local area peer-to-peer network and the wide area network may share a common wireless spectrum to effectuate communication; thus, bandwidth may be shared for transferring data via the disparate types of networks. Further, parameters employed in connection with the local area peer-to-peer network may be a function of parameters utilized for the wide area network; accordingly, the parameters for each type of network may differ even though the networks may operate in the same spectrum. Moreover, the air interface technique used in the peer-to-peer network may be distinct from that used in the wide area network. For example, the wide area network may use an OFDM-based air interface technology (e.g., 3GPPLTE, WiMax, Flash-OPDM, ...), a CDMA-based air interface technology (e.g., CDMA-2000, EV-DO, UMTS wideband CDMA, HSPA, ...) or a TDMA-based air interface technology (e.g., GSM, GPRS, EDGE, ...), while the local area peer-to-peer network may employ an OFDM-based air interface technology.

Figure 2:
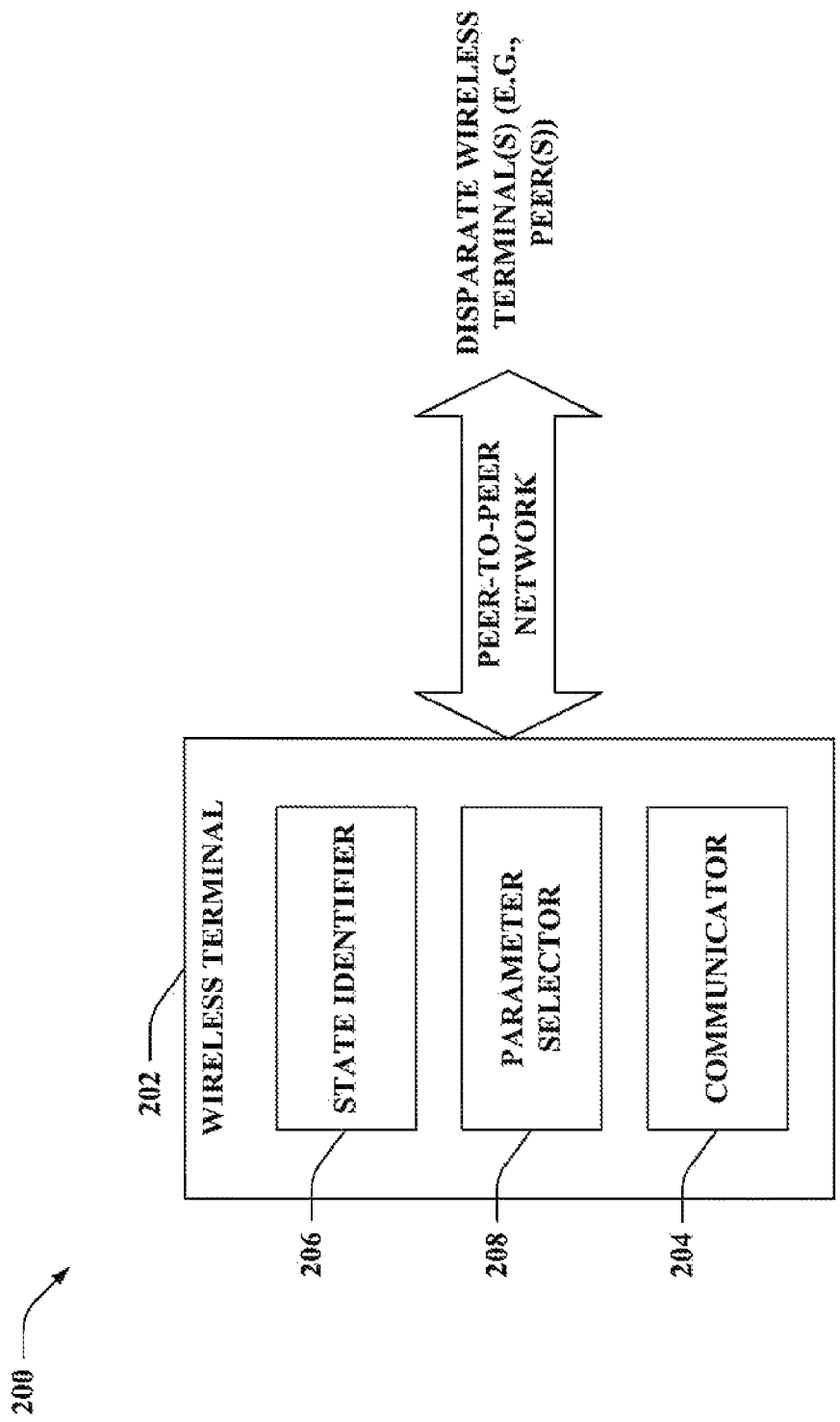
FIG. 2 is an illustration of an example system that selects parameters as a function of a state associated with peer-to-peer communication.

Now turning to FIG. 2, illustrated is a system 200 that selects parameters as a function of a state associated with peer-to-peer communication. System 200 includes a wireless terminal 202 that communicates with disparate wireless terminal(s) (e.g., peer(s)) (not shown) via a peer-to-peer network. Wireless terminal 202 may include a communicator 204 that enables such direct transfers of signals with peers within the peer-to-peer environment. For example, communicator 204 may enable direct transfers of data in the peer-to-peer architecture via a half-duplex mode, where wireless device 202 may be unable to simultaneously receive and transmit signals with peers. Communicator 204 (and/or a disparate component) may further enable wireless terminal 202 to transmit and/or receive data from a base station (not shown) over a wide area network. Moreover, communicator 204 may enable sharing bandwidth for the local area peer-to-peer network and the wide area network.

Wireless terminal 202 may further include a state identifier 206 and a parameter selector 208. State identifier 206 may determine a state currently associated with the local area peer-to-peer network. The peer-to-peer network may be synchronous; thus, wireless terminal 202 and disparate wireless terminals may effectuate peer discovery during a set of time periods, transmit control related traffic during a differing set of time periods, transmit data related traffic in another distinct set of time periods, and so forth. According to an example, state identifier 206 may obtain, sense, derive, generate, etc. timing related information (e.g., current time) from some source, and, based upon the timing information, state identifier 206 may decipher the state at a particular time (e.g., current time). State identifier 206 may enable synchronizing wireless terminal 202 with disparate wireless terminals (e.g., based upon obtained timing information); for example, state identifier 206 may receive a signal from a source (e.g., base station, transmitter, ...) to which operation of wireless terminal 202 may be synchronized. In some embodiment, the source is common for all the wireless terminals in the local area peer-to-peer network, so that the timing information derived from the common source is synchronized for all the wireless terminals. In the local area peer-to-peer network, the state at a given time depends on the time in a predetermined manner. Therefore, in a first time interval, the state is peer discovery, while in a second time interval, the state is traffic. Within the second time interval, a first portion is for traffic control while a second is portion is for an actual traffic segment. Because the timing information is synchronized for all the terminals, the state is also synchronized. Thus, in the first time interval, all the terminals in the local area peer-to-peer network are in the peer discovery state, while in the second time interval, all the terminals are in the traffic state. The terminals achieve the state synchronization by synchronizing their timing and associating the state with timing in a predetermined manner. Therefore, the terminals do not have to explicitly exchange control signaling among them to achieve state synchronization. Thus, wireless terminal communicating via the local area peer-to-peer network may have a common understanding of time. By way of further example, state identifier 206 may recognize a peer discovery state, a control related traffic state, a data related traffic state, a paging state, and the like. States of the peer-to-peer network that correspond to differing times may be predetermined. For example, such information may be retained in a lookup table stored in memory (e.g., accessible with state identifier 206), derived by state identifier 206 (e.g., based upon a predetermined formula), and/or obtained in any manner by state identifier 206.

Parameter selector 208 may access a set of parameters associated with the state as determined by state identifier 206. For example, the parameters may relate to tone spacing, symbol time, cyclic prefix, and so forth for an OFDM-based air interface technology, or CDMA chip rate for a CDMA-based air interface technology. The set of parameters chosen by parameter selector 208 may uniquely correspond to conditions associated with the identified state. In accordance with an example, during peer discovery (and/or control related traffic), parameter selector 208 may identify a set of parameters that mitigates interference between wireless device 202 and disparate wireless device(s) associated with overlapping transmissions (e.g., due to peer-to-peer communication via a half-duplex mode). Each wireless device may randomly select a transmission time during peer discovery (and/or control related traffic). The wireless device may operate in a half-duplex mode so that it cannot simultaneously transmit and listen. As a result, the device may miss the signal sent from other devices while it is transmitting. To reduce the probability of missing the signal from others, it may be desired to reduce the transmission time duration; for example, transmission time duration may be reduced by receiving data for a larger percentage of time and transmitting data for a smaller percentage of time (e.g., since wireless terminal 202 may be unable to concurrently receive and transmit). Thus, the set of parameters may provide for a shortened symbol time (e.g., in comparison to a symbol time utilized by the wide area network). By way of further example, during a data related traffic state, parameter selector 208 may elect a set of parameters that mitigate overhead (e.g., by increasing symbol time relative to cyclic prefix) without balancing parameter optimization upon considerations of half duplex mode since wireless terminal 202 is to either transmit or receive during the associated time period without switching between transmission and reception.

Figure 3:
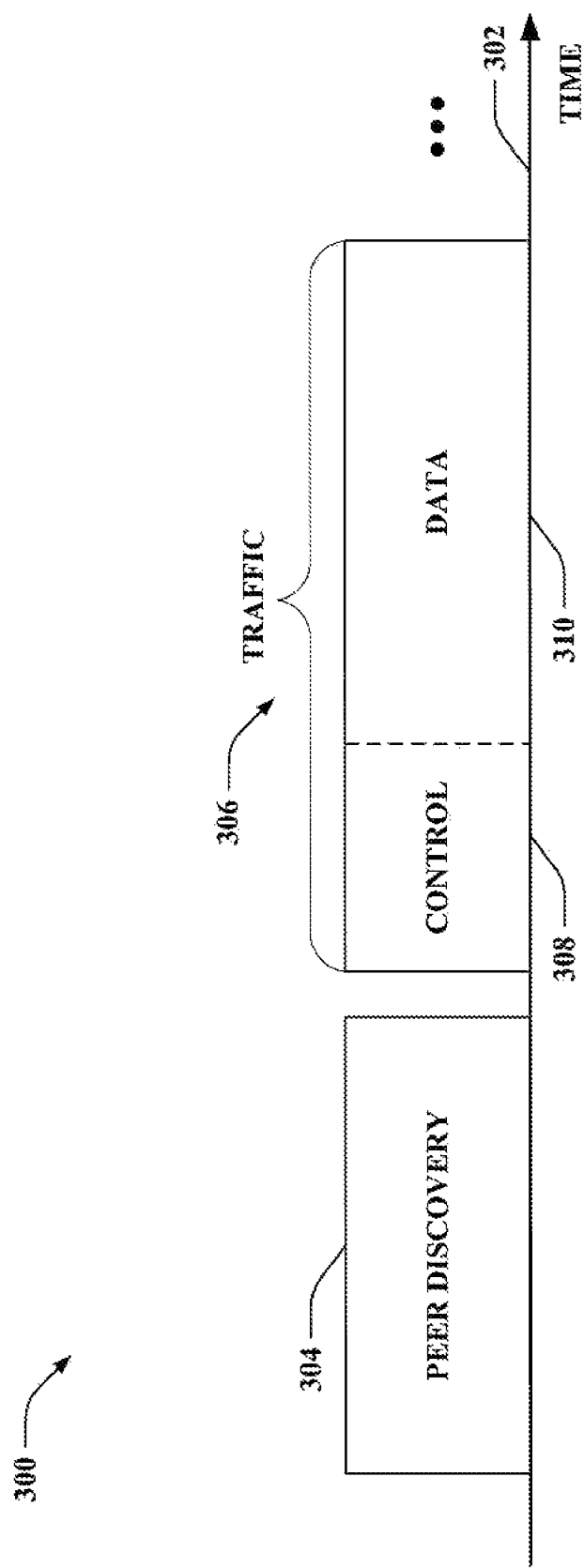
FIG. 3 is an illustration of an example diagram of states associated with communication over a local area peer-to-peer network.

With reference to FIG. 3, illustrated is an example diagram 300 of states associated with communication over a local area peer-to-peer network. According to an example, communicator 204 of FIG.2 may effectuate operations associated with each of the following states for communicating via the peer-to-peer network. As depicted, horizontal axis 302 represents time. States included in diagram 300 may be associated with respective sets of parameters to optimize communication via the peer-to-peer network, where the parameters may be based upon types f signaling that may occur during each state. For example, a peer discovery state 304 may be utilized by peers (e.g., wireless terminals) to determine disparate peers within a range that supports peer-to-peer communication; thus, mutual detection and identification may be effectuated in peer discovery 304. During discovery 304, each peer may transmit data at some randomly selected symbols during the associated time period. Further, to identify peers within range, an amount of receiving time for each peer may be maximized (e.g., to mitigate the impact of the half-duplex operation) since the peer-to-peer network utilizes half-duplexing. Moreover, traffic 306 may include a control portion 308 (e.g., control related traffic state) and a data portion 310 (e.g., data related traffic state). Control portion 308, for example, may be utilized to sense interference in the peer-to-peer environment. Accordingly, control portion 308 may be associated with conditions similar to peer discovery 304, since peers may transmit at randomly selected symbols during the state (e.g., while utilizing a large percentage of the time for receiving data to monitor interference in the environment). Thus, a set of parameters similar to those employed for peer discovery 304 may be utilized with control portion 308. Further, during data portion 310, each peer may transmit or receive information without switching back and forth. Hence, a constraint associated with the half duplex mode need not be considered when choosing optimized parameters for data portion 310. Additionally, although not depicted, it is to be appreciated that disparate states (e.g., paging, ... ) may be associated with peer-to-peer communications. Further, the time periods for effectuating each state may be predetermined.

Figure 4:
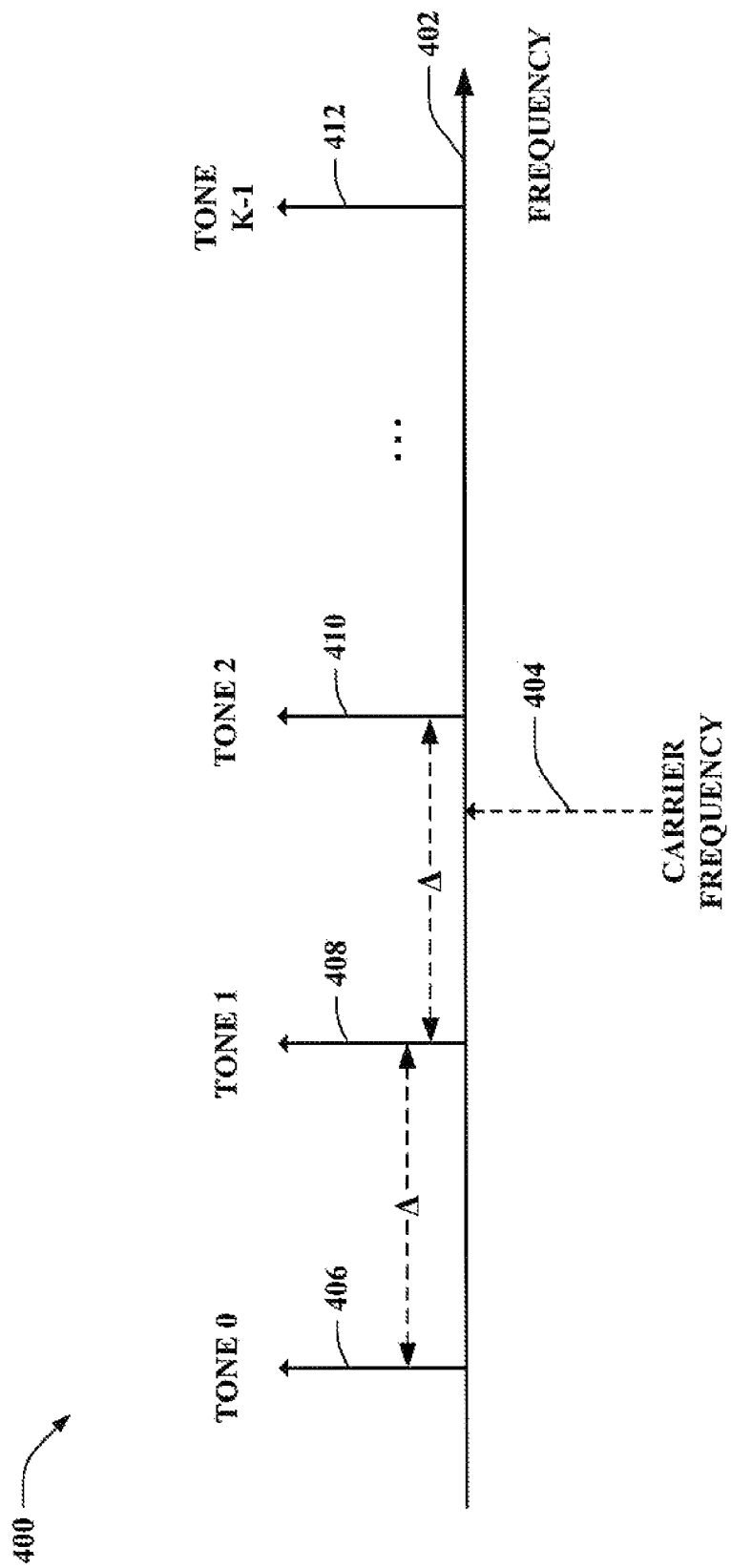
FIG. 4 is an illustration of an example frequency spectrum in accordance with various aspects.

With reference to FIG. 4, illustrated is an example frequency spectrum 400 in accordance with various aspects. As depicted, horizontal axis 402 represents frequency. A total amount of available bandwidth for a particular carrier frequency 404 may divided into K equally spaced tones (e.g., with tone spacing of $\Delta$), where K may be any integer. These tones may be indexed from 0 to K-1. For example, tone 0 406, tone 1 408, tone 2 410 and tone K-1 412 are illustrated; however, the claimed subject matter is not so limited.

Tone spacing, $\Delta$, may be a unique parameter that corresponds to local area peer-to-peer network states. For example, similar tone spacing may be utilized for a peer discover state and a control related traffic state, and distinct tone spacing may be employed for a data related traffic state. By way of further example, a wide area network may utilize a tone spacing that varies from at least one of the tone spacings associated with the local area peer-to peer network. Moreover, each particular type of wide area network may be associated with a corresponding tone spacing (e.g., Flash-OFDM may utilize a tone spacing of 11.25 kHz, 3GPP2 may employ a tone spacing of 9.6 kHz, ... ). Additionally, tone spacings associated with the different states of the local area peer-to-peer network may be a function of tone spacing of the particular type of wide area network with which a common bandwidth is shared(e.g., the local are peer-to-peer network may be effectuated within a least a portion of the geographic area covoered by the wide area network). Thus, in accordance with an example, if the local area peer-to-peer network coexists in a given spectrum with 3GPP2, the parameters of each state associated with peer-to-peer communication (e.g., including the tone spacing) may be a function of the parameters (e.g., tone spacing) for 3GPP2.

Tone spacing may depend on mobility. For example, mobility may cause a Doppler effect, which yields a frequency shift. Accordingly, tone 0 406 may be transmitted with a corresponding frequency; however, when obtained at a receiver, tone 0 406 may have shifted to a different frequency. Tone spacing may be selected that is much larger than an expected Doppler shift. Pursuant to an example, the tone spacing may be about a factor of 100 greater than the expected Doppler. Hence, if the expected doppler shift is 100 Hz (e.g., for a WAN), the tone spacing may be an order of 10 kHz. However, it is to be appreciated that the claimed subject matter is not so limited to the aforementioned example, Moreover, for a local area peer-to-peer environment, mobility may be lower as compared to wide area networks, and thus, the Doppler may be smaller. Accordingly, smaller tone spacing may be employed for local area peer-to-peer networks (e.g., for the data related traffic state since tone spacing and/or symbol time need not be based upon considerations of interference mitigation).

Figure 5:
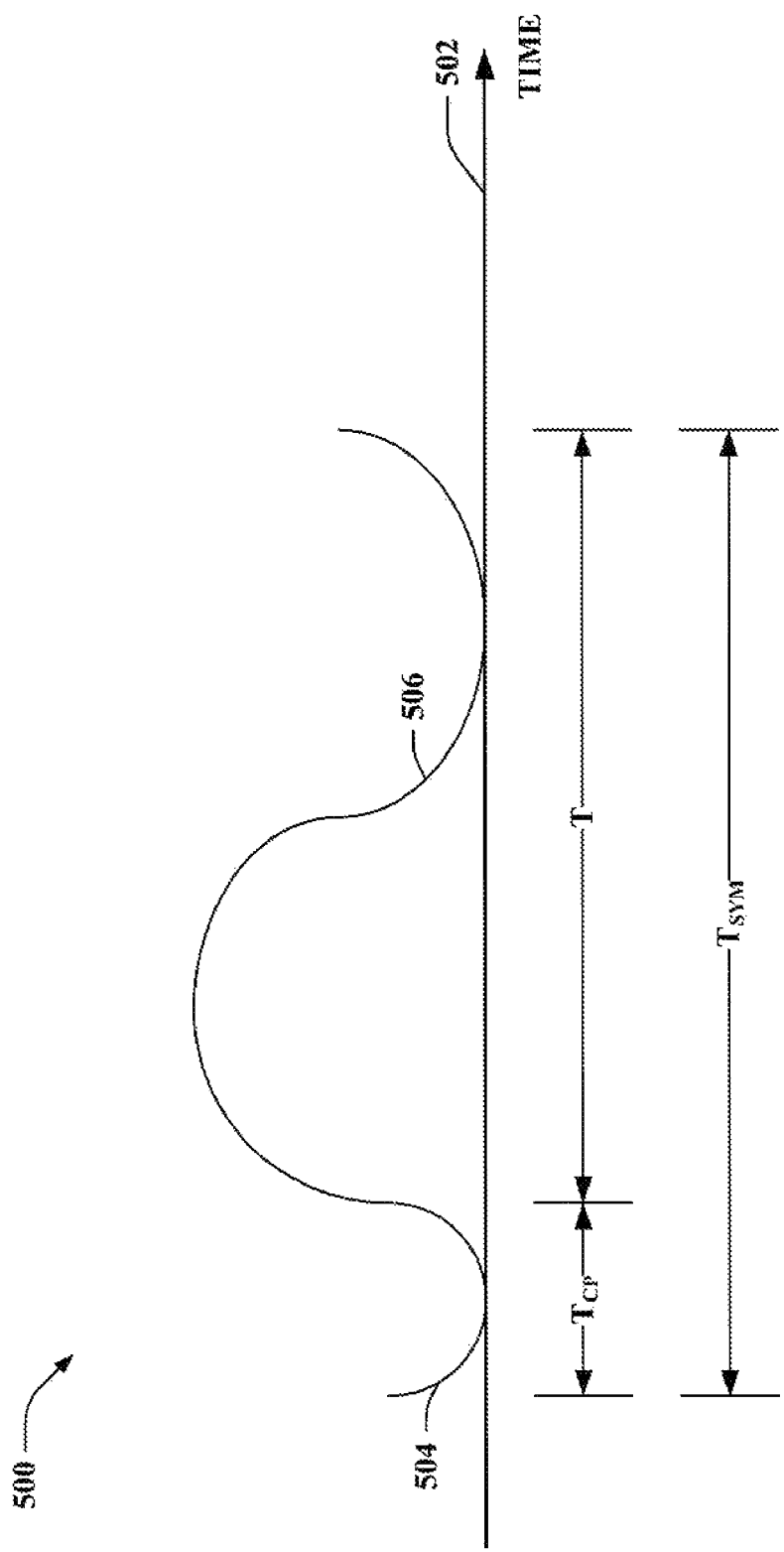
FIG. 5 is an illustration of an example symbol that may be transferred in accordance with various aspects described herein.

Turning to FIG. 5, illustrated is an example symbol 500 that may be transferred in accordance with various aspects described herein. As illustrated, horizontal axis 502 represents time. Symbol 500 may be sinusoidal (e.g., in an OFDM environment). Symbol 500 TSYM, includes a cyclic prefix 504 and portion 506 that may carry data (also known as the IFFT window). The length of portion 506 is usually equal to $$\frac{1}{\Delta},$$

where $\Delta$ is the tone spacing. Time duration of cyclic prefix 504, $T_{CP}$, may be greater than an expected delay spread. Further, $T_{CP}$ and $T_{SYM}$ may be parameters selected for peer-to-peer networks (e.g., differing values for distinct states) and wide area networks.

Multipath propagation may cause delay spread. For example, a single transmitted signal mazy reach a receiver by two or more paths. According to this example, copies of the signal may be obtained at differing times associated with the disparate paths. Delay spread may correlate to a size of an area over which signals propagate within a particular network. Pursuant to an illustration, in wide area network (e.g., which may be associated with a large geographic area), delay spread may be around 2 to 3 µs; thus, the cyclic prefix (e.g., $T_{CP}$) may be around 10 µs. Further, for a local area peer-to-peer network, the delay spread may be smaller (e.g., due to being associated with a smaller geographic area); for instance, the delay spread may be on the order of nanoseconds. Accordingly, a cyclic prefix (e.g., $T_{CP}$) associated with the local area peer-to-peer network may also be on the order of 1 µs. Moreover, for example, the cyclic prefix may be similar for disparate states related to the local area peer-to-peer network (e.g., cyclic prefix may be similar for peer discovery, control related traffic, data related traffic, . . . ).

Cyclic prefix 504 is overhead within symbol 500. For example, in a wide area network, 10% of symbol 500 may be overhead (e.g., $T_{CP}$ may be 10 µs and $T_{SYM}$ may be 100 µs). Further, for a local area network, tone spacing (Δ) may be smaller in comparison to tone spacing of the wide area network (e.g., for the data related traffic state), and therefore, the FFT window (e.g., $T_{SYM}$) may be increased, which thereby reduces overhead.

Reduction of overhead (e.g., by increasing symbol time and decreasing tone spacing) may be balanced against another design constraint, described below, in the local area peer-to-peer network (e.g., during peer discovery and control related traffic). Peers may lack an ability to receive and transmit simultaneously in the peer-to-peer network. For example, peer discovery may be effectuated such that peers transmit signature signals at random time locations. Accordingly, when a peer transmits its signature signal, it may lack an ability to receive signature signal(s) transmitted by disparate peer(s). Thus, as symbol time TSYM increases the probability that a disparate peer will concurrently transmit a symbol increases, making it more likely for one peer to miss the signal sent by another peer; hence, symbol times for the peer-to-peer network utilized during peer discovery and control related traffic may be shorter than those utilized for the wide area network and/or data related traffic associated with peer-to-peer communication to mitigate probability of overlap of transmission from differing peers.

Figure 6:
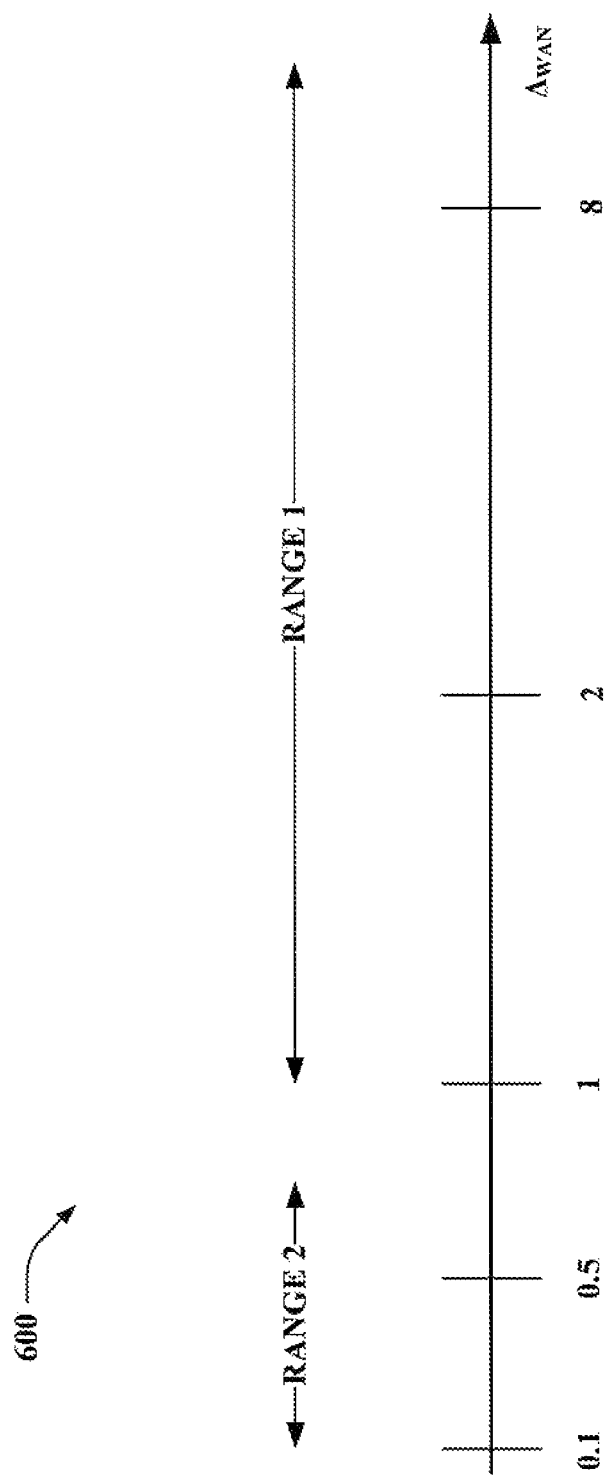
FIG. 6 is an illustration of an example graph of parameter ranges that may be employed during different states in a local area peer-to-peer environment.

Referring to FIG. 6, illustrated is an example graph 600 of parameter ranges that may be employed during differing states in a local area peer-to-peer environment. According to an example, parameters utilized for the peer-to-peer environment may be a function of parameters associated with a wide area network currently using spectrum bandwidth available for peer-to-peer communication. Graph 600 depicts tone spacing ranges in relation to wide area network tone spacing. Peer-to-peer tone spacing may be a function of wide area network tone spacing such that $\Delta_{P2P}=f(\Delta_{WAN})$, where $\Delta_{P2P}$ is the tone spacing for the peer-to-peer network and $\Delta_{WAN}$ is the tone spacing for the wide area network. For example, $\Delta_{P2P}=N\Delta_{WAN}$, where N is a real number. Accordingly, in range 1, N≥1 (e.g., N=2, 4, 8, 10, 12, 16, . . . ). Tone spacings in range 1 may be utilized for peer discovery, control related traffic, and so forth. In range 1, the tone space is large and the symbol time is short. Further, range 2 may be associated with tone spacings employed for a data related traffic state, where range 2 may include tone spacings such that N<1 (e.g., N=½, ¼, ⅛, 1/10, 1/12, 1/16, . . . ). In range 2, the tone space is small and the symbol time is long. Pursuant to another example, tone spacing associated with peer discovery and control related traffic may be almost 5 times greater than tone spacing utilized for data related traffic. In accordance with a further example, peer discovery and control related traffic may employ a tone spacing of $8\Delta_{WAN}$ (e.g., within range 1), while a tone spacing of $\Delta_{WAN}$ or $$\frac{1}{2}\Delta_{WAN}$$

(e.g., within range 2) may be utilized for data related traffic; thus, the ratio of between these tone spacings may be 8 or 16, for instance. However, it is to be appreciated that the claimed subject matter is not limited to the aforementioned examples.

Figure 7:
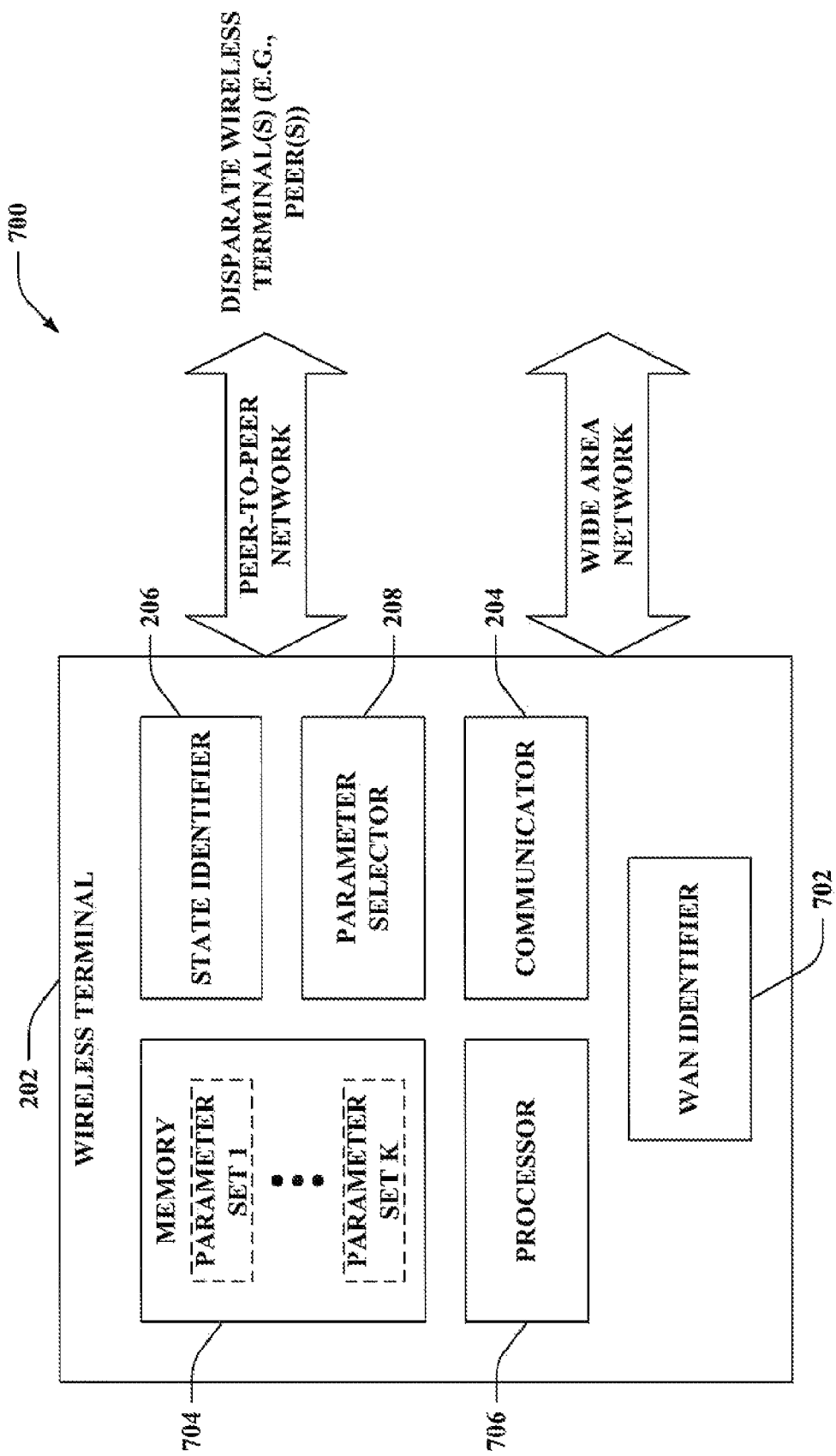
FIG. 7 is an illustration of an example system that utilizes a shared spectrum to enable communication via a wide area network and a peer-to-peer network.

Now turning to FIG. 7, illustrated is a system 700 that utilizes a shared spectrum to enable communication via a wide area network and a peer-to-peer network. System 700 includes wireless terminal 202 that may further comprise communicator 204, state identifier 206, and parameter selector 208. Communicator 204 (and/or a disparate component (not shown)) may enable sending and/or receiving data via a wide area network (e.g., communication with a base station (not shown)). Further, communicator 204 may enable communication via a local area peer-to-peer network. Wireless terminal 202 may communicate via any type of wide area network (e.g., 3GPP LTE, 3GPP2 EV-DO, CDMA-2000, UMTS W-CDMA, GSM, EDGE, WiMax, Flash-OFDM, . . . ). For example, an Orthogonal Frequency Division Multiplexing-Time Division Duplex (OFDM-TDD) mode may be utilized by wireless terminal 202 for obtaining and/or transmitting data over the wide area network (e.g., uplink traffic at a first set of times, downlink traffic at a disparate set of times, . . . ). Moreover, communicator 204 enables wireless terminal 202 to communicate with disparate peer(s) (e.g., disparate wireless terminal(s) (not shown)); however, wireless terminal 202 may be unable to concurrently transmit and receive signals while communicating via the peer-to-peer environment in a half-duplex manner, for example.

Further, state identifier 206 may determine a state associated with peer-to-peer communications (e.g., at a particular time). State identifier 206 may get timing information from some system source. Exemplary sources include the wide area network base station sending a broadcast signal (beacon, PN, . . . ), an access point in the local area peer-to-peer network, an internal clock, and a satellite (e.g., GPS). State identifier 206 can then determine the state associated with a particular time according to the timing information and the predetermined mapping between the time and the state. Moreover, parameter selector 208 may identify a set of parameters to employ for peer-to-peer communications based upon the determined state. For example, parameter selector 208 may choose a set of parameters (e.g., shorter symbol time, larger tone spacing, . . . ) that minimizes a probability of disparate peer(s)transmitting at substantially similar times as compared with wireless terminal 202 when state identifier 206 recognizes that the state relates to peer discovery or control related traffic; thus, wireless terminal 202 would likely not miss such data transferred from the disparate peer(s) upon employing such set of parameters.

Wireless terminal 202 may further include a WAN identifier 702 that may determine whether a spectrum bandwidth is available to wireless terminal 202 for peer-to-peer communications. Further, WAN identifier 702 may detect the type of the wide area network currently using the spectrum bandwidth, for example, the specific air interface technology using the WAN. In accordance with this example, WAN identifier 702 may ascertain that the wide area network is one of LTE, 3GPP, 3GPP2, UMTS, WiMax, Flash-OFDM, etc. type wide area network. By way of another example, WAN identifier 702 may further detect system parameters related to the available wide area network. Moreover, parameter selector 208 may access parameter data to be utilized for the peer-to-peer network during an identified state as a function of the identified air interface technology used by the wide area network (e.g., type of available wide area network determined by WAN identifier 702) and/or the associated system parameters. The set of parameters for the peer-to-peer network may thereafter be employed to transmit and/or receive data during the associated time segment for the state.

Moreover, wireless terminal 202 may include memory 704 and a processor 706. Memory 704 may retain lookup table(s) that specify parameter sets (e.g., parameter set 1, parameter set K, . . . ) that correspond to various states associated with the peer-to-peer network, Further, memory 704 may include wide area network parameters that correspond to various types of wide area networks. Additionally, memory 704 may retain instructions related to determining an identity of a wide area network, detecting parameters associated with the wide area network, identifying a state associated with a peer-to-peer network, identifying and/or deriving parameters to employ with the peer-to-peer network, and so forth. Moreover, processor 706 may execute instructions and/or functions described herein.

According to example, wireless terminal 202 may enter into a wide area network. WAN identifier 702 may determine an identity of the wide area network. Additionally or alternatively, WAN identifier 702 may sense information about the wide area network (e.g., parameters of the wide area network). State identifier 206 may determine a state associated with a local area peer-to-peer network. Further, parameter selector 208 may utilize a lookup table retained in memory 704 to choose peer-to-peer parameters (e.g., tone spacing, symbol time, cyclic prefix, . . . ) to employ for communicating via the local area peer-to-peer network. For instance, the lookup table stored in memory 704 may specify values for one or more of the peer-to-peer parameters that correlate to the identified type of wide are network and/or state. Thus, based upon the identity of the wide area network and the recognized state parameter selector 208 may employ the lookup table or predetermined formula to determine parameters to be employed.

By way of a further illustration, parameter selector 208 may calculate parameters to be employed with a local area peer-to-peer network based upon an identified state. WAN identifier 702 may determine WAN parameters employed for a wide area network in the same spectrum as a peer-to-peer network. For instance, WAN identifier 702 may find a Beacon, a PN (pseudo random) sequence signal, a pilot signal or other broadcast signals (e.g., transmitted by a base station (not shown)), which may be a signature signal associated with a wide area network. Further, WAN identifier 702 may analyze the broadcast signal to estimate WAN parameters associated with the wide area network. According to another example, WAN identifier 702 may identify the type of wide area network (e.g., the air interface technology used) and determine WAN parameters associated therewith from a lookup table retained in memory 704. It is to be appreciated, however, that the claimed subject matter is not limited to the aforementioned examples. Thereafter, parameter selector 208 may derive parameters for the peer-to-peer network as a function of the WAN parameters and a current state determined by state identifier 206. Thus, parameter selector 208 may optimize selection of peer-to-peer parameters based upon knowledge of the WAN parameters for use on a wide area network in the same spectrum as well as conditions corresponding to a current peer-to-peer related state.

If the peer-to-peer network coexists in a given spectrum with the wide area network, P2P parameters may be a function of WAN parameters and P2P state. According to an example, parameter selector 208 may generate P2P parameters based upon such function. Pursuant to a further example, information describing P2P parameters that correlate to WAN parameters and/or states may be included in lookup table(s) retained in memory 704. According to an illustration, suppose that both the WAN and the P2P networks use OFDM-based air interface technologies. The P2P parameters may be chosen such that $\Delta_{P2P}=f(\Delta_{WAN})$, where $\Delta_{P2P}$ is the tone spacing for the peer-to-peer network and $\Delta_{WAN}$ is the tone spacing for the wide area network. For example, $\Delta_{P2P}=N\Delta_{WAN}$, where N is a real number. When the state identifier 206 determines that the peer-to-peer environment is associated with a peer discovery state or a control related traffic state, N≥1 (e.g., N=2, 4, 8, 10, 12, 16, . . . ). In another example, state identifier 206 may recognize a data related traffic state associated with the peer-to-peer environment; thus, N<1 (e.g., N=½, ¼, ⅛, 1/10, 1/12, 1/16, . . . ). Moreover, the length of the cyclic prefix is chosen such that $T_{CP\_P2P}=g(T_{CP\_WAN})$ (e.g., $$T_{CP\_P2P} = \frac{1}{K} T_{CP\_WAN},$$

where K=2, 4, 8, 10, 12, 16, . . . ). While N is different for different states, in one embodiments, K is the same for all the states. For example, N=8 for the peer discovery state or a control related traffic state, and N=½ for a data related traffic state. However, K=8 for the three states. Thus, in various embodiments, the tone spacing utilized for the peer-to-peer network may be N times larger than the tone spacing employed for the wide area network, and the symbol time for the peer-to-peer network may be N times shorter than the symbol time for the wide area network. Note that functions f or g may depend on the particular air interface used by the WAN. For example, the functions f or g may be different if the WAN uses the 3GPP LTE air interface technology of if the WAN uses the WiMax air interface technology, even though both technologies may be based on OFDM. Furthermore, according to an illustration, suppose that the P2P network uses OFDM-based air interface technology but the WAN network uses a CDMA-based air interface technology, such as UMTS W-CDMA. The P2P parameters may be chosen such that $\Delta_{P2P}=h(FC_{WAN})$, where $FC_{WAN}$ may represent a system parameter used in the UMTS W-CDMA (e.g., CDMA chip rate).

Figure 8:
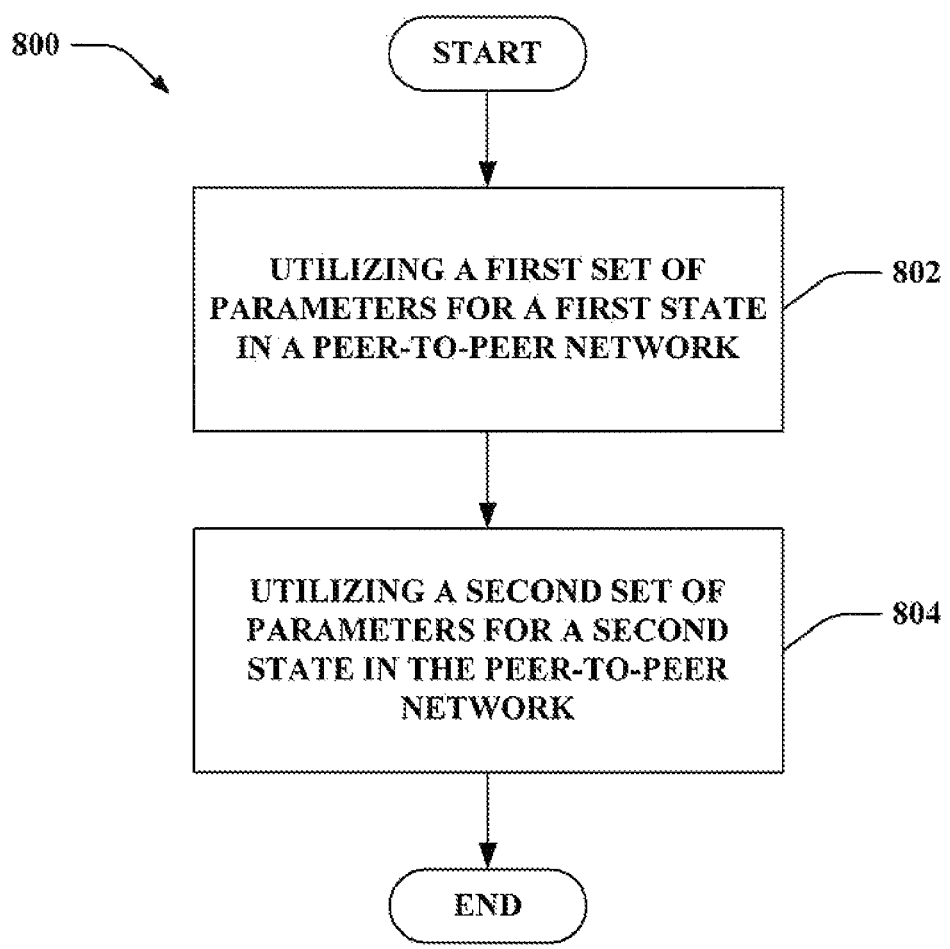
FIG. 8 is an illustration of an example methodology that facilitates selecting parameters in a local area peer-to-peer network.
Figure 9:
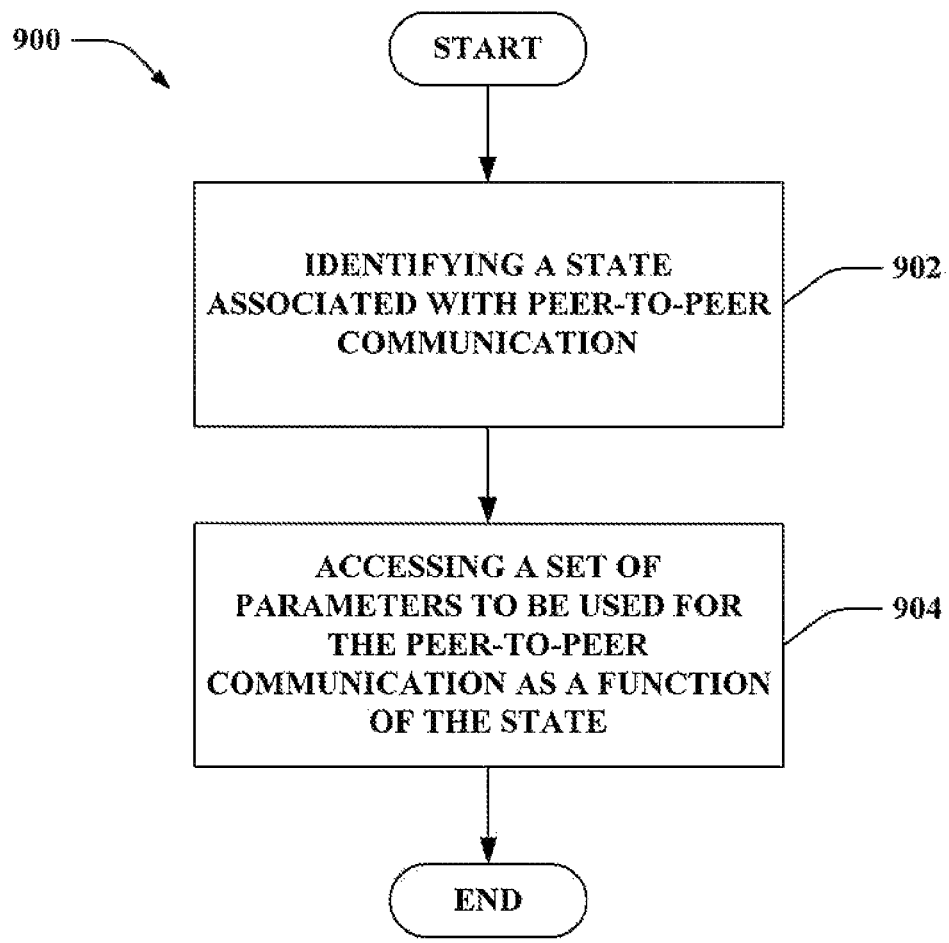
FIG. 9 is an illustration of an example methodology that facilitates identifying parameters to be used for communicating via a local area peer-to-peer network.
Figure 10:
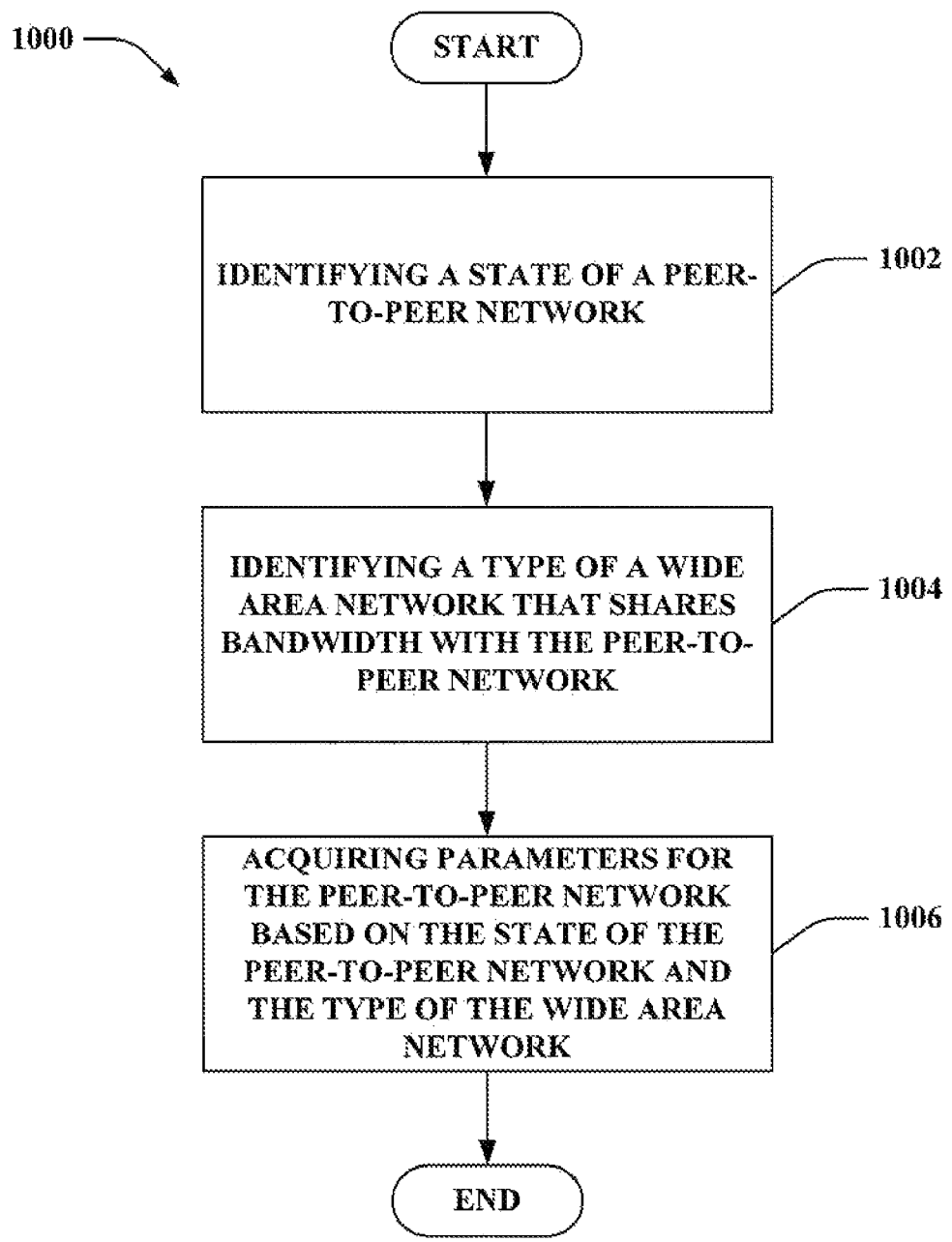
FIG. 10 is an illustration of an example methodology that facilitates identifying peer-to-peer parameters based upon a state and a type wide area network (e.g., air interface technology).

Referring to FIGS. 8-10, methodologies relating to selecting parameters for communicating in a peer-to-peer environment based upon an identified state are illustrated. While, for purposes of simplicity of explanation, the methodologies are shown and described as a series of acts, it is to be understood and appreciated that the methodologies are not limited by the order of acts, as some, in accordance with one or more embodiments, occur in different orders and/or concurrently with other acts from that shown and described herein. For example, those skilled in the are will understand and appreciate that a methodology could alternatively be represented as a series of interrelated states or events, such as in a state diagram. Moreover, not all illustrated acts may be required to implement a methodology in accordance with one or more embodiments.

Referring to FIG. 8, illustrated is a methodology 800 that facilitates selecting parameters in a local area peer-to-peer network. At 802, s first set of parameters may be utilized for a first state in a peer-to-peer network. For example, the parameters may relate to tone spacing, symbol time, cyclic prefix and so forth. The first set of parameters may be employed to transmit and/or receive over the peer-to-peer network during a time period associated with the first state. At 804, a second set of parameters may be utilized for a second state in the peer-to-peer network. The second set of parameters may be utilised to send and/or obtain data over the peer-to-peer network in a time period corresponding to the second state. Various states may be associated with communication via the peer-to-peer network. For example, peer-to-peer communication may utilize a peer discovery state, a control related traffic state, a data related traffic state, a paging state, and the like. Moreover, disparate states may employ differing sets of parameters. By way of example, peer discovery and control related traffic may be optimized to mitigate and/or manage interference between transmissions of different peers; thus, such states may utilize a set of parameters that include shorter symbol times and larger tone spacings. According to a further example, data related traffic may leverage parameters that mitigate overhead (e.g., associated with the cyclic prefix), since each peer either transmits or receives data without switching during a time frame associated with such state. Hence, the set of parameters for the data related traffic state may include a longer symbol time and a smaller tone spacing, which may decrease a percentage of overall symbol time associated with the cyclic prefix to reduce overhead.

Now turning to FIG. 9, illustrated is a methodology 900 that facilitates identifying parameters to be used for communicating via a local area peer-to-peer network. At 902, a state associated with peer-to-peer communication may be identified. States utilized for peer-to-peer communication may occur at predetermined times (e.g., determined based upon a predetermined formula). Further, peers within the peer-to-peer network may be synchronized (e.g., based upon a received signal), and thus, each peer may recognize time periods associated with peer discover, data related traffic, control related traffic paging, etc. Pursuant to an illustration, a current time may be identified and a state that corresponds to the current time may be ascertained. Therefore, for example, the state may be calculated based upon a formula, retrieved from a lookup table retained in memory, sensed, and the like. At 904, a set of parameters to be used for the peer-to-peer communication may be accessed as a function of the state. In accordance with an example, one or more of the parameters may be obtained from a lookup table retained in memory. Pursuant to another example, one or more of the parameters may be calculated based at least in part upon the state. Further, the peer-to-peer network may share spectrum with a wide area network. Accordingly, the set of parameters may be a function of the state as well as disparate parameters associated with the wide area network. The set of parameters for peer-to-peer communication may be employed to transmit and/or receive data over the peer-to-peer network. By way of example, the set of parameters for a peer discovery state or control related traffic state may reduce the probability that a half-duplex peer may miss the signal transmitted by a second peer while the first peer is itself transmitting. According to another example, the set of parameters for a data related traffic state may mitigate overhead by including longer symbol times and/or smaller tone spacings.

Turning to FIG. 10, illustrated is a methodology 100 that facilitates identifying peer-to-peer parameters based upon a state and a type wide area network (e.g., air interface technology). At 1002, a state of a peer-to-peer network may be identified. For example, states associated with peer discovery, control related traffic, data related traffic, and so forth may be recognized based upon a time value. At 1004, a type of wide area network that shares bandwidth with the peer-to-peer network may be identified. For example, the wide area network may use an OFDM-based air interface technology (e.g., 3GPP LTE, WiMax, Flash-OFDM, . . . ), a OFDM-based air interface technology (e.g., CDMA-2000, EV-DO, UTMS wide band CDMA, HSPA, . . . ) or a TDMA-based air interface technology (e.g., GSM, GPRS, EDGE, . . . ). Additionally, WAN parameters may be determined, where the WAN parameters may relate to tone spacing, symbol time, cyclic prefix and so forth for an OFDM-based air interface technology, or CDMA chip rate for a CDMA-based air interface technology, At 1006, parameters for the peer-to-peer network may be acquired based on the state of the peer-to-peer network and the type of the wide area network. For example, parameters for the peer-to-peer network may be derived based upon the state and the WAN parameters. Further, peer-to-peer network may be retrieved from a lookup table retained in memory based upon the state and the type of air interface technology employed in the wide area network.

It will be appreciated that in, accordance with one or more aspects described herein, inferences can be made regarding determining parameters to utilize for peer-to-peer communications based upon a state of a peer-to-peer network. As used herein, the term to "infer" or "interference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining parameters to utilize in connection with communicating via the peer-to-peer network. In accordance with another example, an inference may be made related to selecting optimized parameters based upon a state and/or type of wide area network that leverages a shared spectrum with the peer-to-peer network. It will be appreciated that the foregoing examples are illustrative in nature and are not intended to limit the number of inferences that can be made or the manner in which such inferences are made in conjunction with the various embodiments and/or methods described herein.

Figure 11:
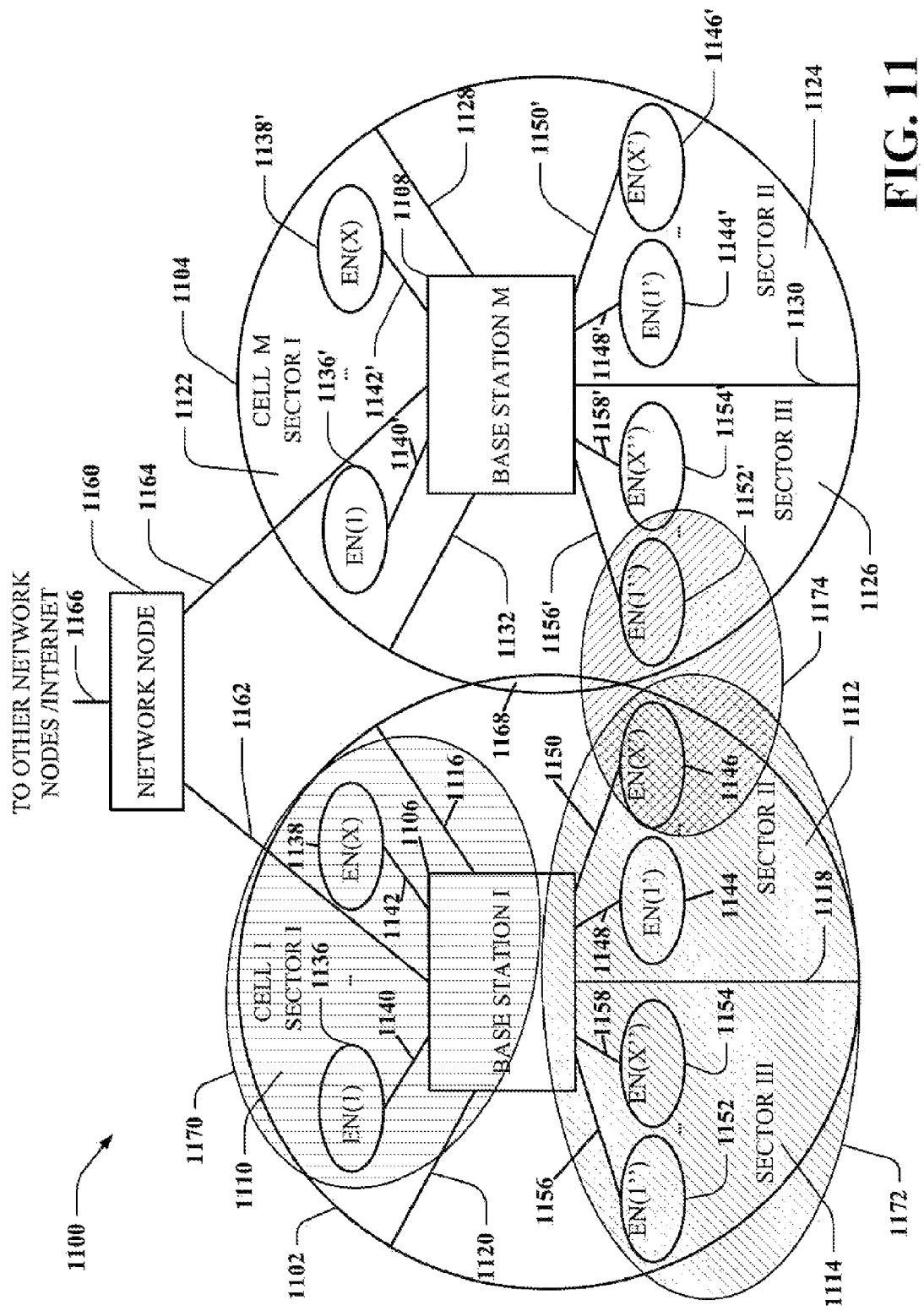
FIG. 11 is an illustration of an example communication system implemented in accordance with various aspects including multiple cells.

FIG. 11 depicts an example communication system 1100 implemented in accordance with various aspects including multiple cells: cell I 1102, cell M 1104. Note that neighboring cells 1102, 1104 overlap slightly, as indicated by cell boundary region 1168, thereby creating potential for signal interference between signals transmitted by base stations in neighboring cells. Each cell 1102, 1104 of system 1100 includes three sectors. Cell which have not be subdivided into multiple sectors (N=1),cells with two sectors (N=2) and cells with more than 3 sectors (N>3) are also possible in accordance with various aspects. Cell 1102 includes a first sector, sector I 1110, a second sector, sector II 1112, and a third sector, sector III 1114. Each sector 1110, 1112, 1114 has two sector boundary regions; each boundary region is shared between two adjacent sectors.

Sector boundary regions provide potential for signal interference between signals transmitted by base stations in neighboring sectors. Line 1116 represents a sector boundary region between sector I 1110 and sector II 1112; line 1118 represents a sector boundary region between sector II 1112 and sector III 1114; line 1120 represents a sector boundary region between sector III 1114 and sector I 1110. Similarly, cell M 1104 includes a first sector, sector I 1122, a second sector, sector II 1124, and a third sector, sector III 1126. Line 1128 represents a sector boundary region between sector I 1122 and sector II 1124; line 1130 represents a sector boundary region between sector II 1124 and sector III 1126; line 1132 represents a boundary region between sector III 1126 and sector I 1122. Cell I 1102 includes a base station (BS), base station I 1106, and a plurality of end nodes (ENs) (e.g., wireless terminals) in each sector 1110, 1112, 1114. Sector I 1110 includes EN(1) 1136 and EN(X) 1138 coupled to BS 1106 via wireless links 1140, 1142, respectively; sector II 1112 includes EN(1') 1144 and EN(X') 1146 coupled to BS 1106 via wireless links 1148, 1150, respectively; sector III 1114 includes EN(1") 1152 and EN(X") 1154 coupled to BS 1106 via wireless links 1156, 1158, respectively. Similarly, cell M 1104 includes base station M 1108, and a plurality of end nodes (ENs) in each sector 1122, 1124, 1126. Sector I 1122 includes EN(1) 1136' and EN(X) 1138' coupled to BS M 1108 via wireless links 1140', 1142', respectively; sector II 1124 includes EN(1') 1144' and EN(X') 1146' coupled to BS M 1108 via wireless links 1148', 1150', respectively; sector 3 1126 includes En(1") 1152' and EN(X") 1154' coupled to BS 1108 via wireless links 1156', 1158', respectively.

System 1100 also includes a network node 1160 which is coupled to BS I 1106 and BS M 1108 via network links 1162, 1164, respectively. Network node 1160 is also coupled to other network nodes, e.g., other base stations, AAA server nodes, intermediate nodes, routers, etc., and the Internet via network link 1166. Network links 1162, 1164, 1166 may be, e.g., fiber optic cables. Each end node, e.g., EN(1) 1136 may be a wireless terminal including a transmitter as well as a receiver. The wireless terminals, e.g., EN(1) 1136 may move through system 1100 and may communicate via wireless links with the base station in the cell in which the EN is currently located. The wireless terminals, (WTs), e.g., EN(1) 1136, may communicate with peer nodes, e.g., other WTs in system 1100 or outside system 110 via a base station, e.g., BS 1106, and/or network node 1160. WTs, e.g., EN(1) 1136 may be mobile communications devices such as cell phones, personal data assistants with wireless modems, etc. Respective base stations perform tone subset allocation using a different method for the strip-symbol periods, from the method employed for all allocating tones and determining tone hopping in the rest symbol periods, e.g., non strip-symbol periods. The wireless terminals use the tone subset allocation method along with information received from the base station, e.g., base station slope ID sector ID information, to determine tones that they can employ to receive data and information at specific strip-symbol periods. The tone subset allocation sequence is constructed, in accordance with various aspects to spread inter-sector and inter-cell interference across respective tones.

Local area peer-to-peer communication may also be supported by communication system 1100. For example, a common spectrum may be utilized for both local area peer-to-peer communication as well as communication via the wide area network (e.g., cellular infrastructure network). Wireless terminals may communicate with other peers via a local area peer-to-peer network such as peer-to-peer networks 1170, 1172, and 1174. Although three peer-to-peer networks, 1170-1174 are depicted, it is to be appreciated that any number, size, shape, etc. of peer-to-peer networks may be supported. For instance, each peer-to-peer network 1170-1174 may support transfer of signals directly between wireless terminals. Further, each peer-to-peer network 1170-1174 may include wireless terminals within a similar geographic area (e.g., within range of one another). For example, EN(1) 1136 may communicate with EN(X) 1138 by way of the local area peer-to-peer network 1170. However, it is to be appreciated that wireless terminals need not be associated with the same sector and/or cell to be included in a common peer-to-peer network. Further, peer-to-peer networks may overlap (e.g., EN(X') 1146 may leverage peer-to-peer networks 1172 and 1174). Additionally, a wireless terminal may not be supported by a peer-to-peer network. Wireless terminal may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Figure 12:
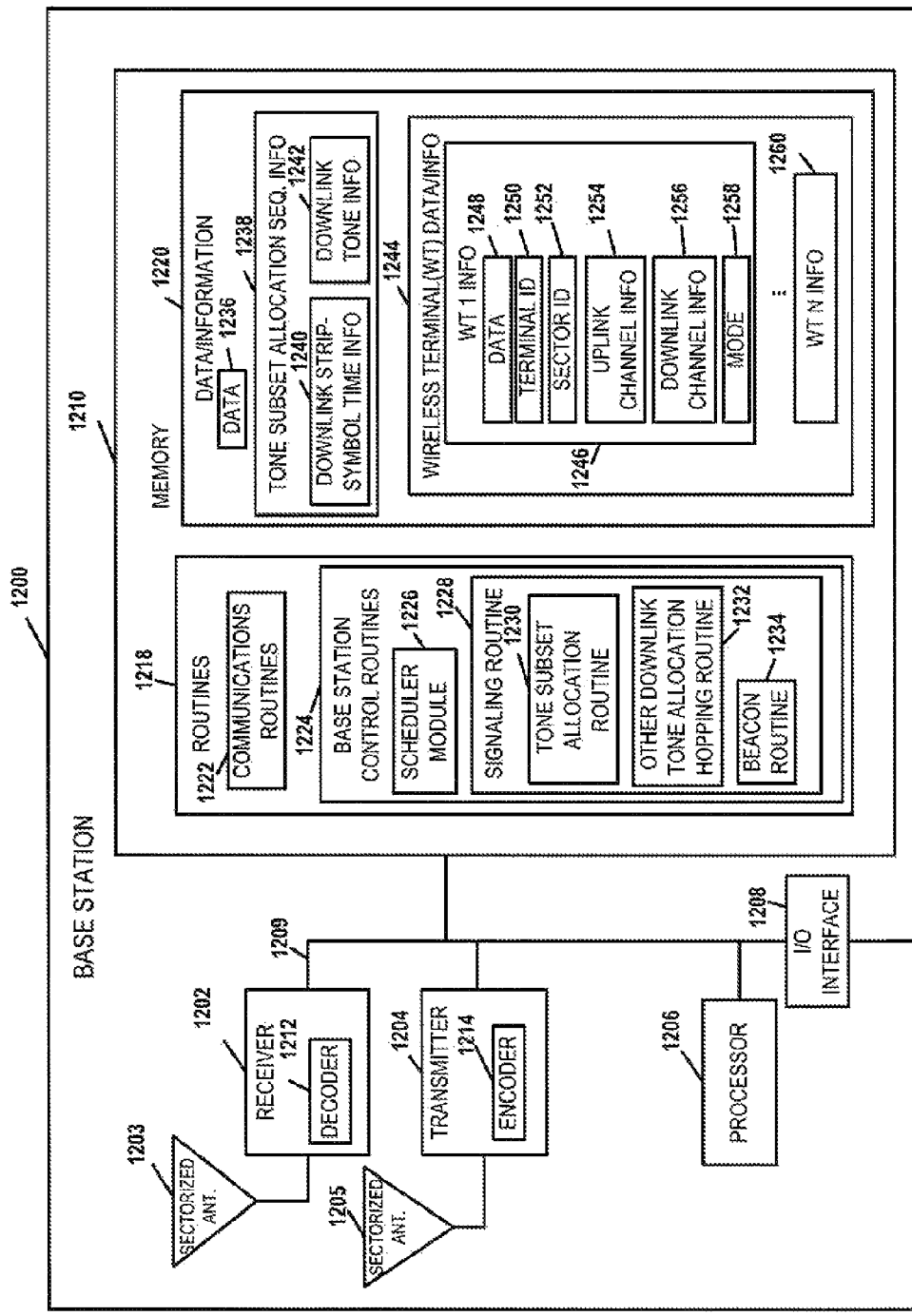
FIG. 12 is an illustration of an example base station in accordance with various aspects.

FIG. 12 illustrates an example base station 1200 in accordance with various aspects. Base station 1200 implements tone subset allocation sequences, with different tone subset allocation sequences generated for respective different sector types of the cell. Base station 1200 may be used as any one of base station 1106, 1108 of the system 1100 of FIG. 11. The base station 1200 includes a receiver 1202, a transmitter 1204, a processor 1206, e.g., CPU, an input/output interface 1208 and memory 1210 coupled together by a bus 1209 over which various elements 1202, 1204, 1206, 1208, and 1210 may interchange data and information.

Sectorized antenna 1203 coupled to receiver 1202 is used for receiving data and other signals, e.g., channel reports, from wireless terminals transmissions from each sector within the base station's cell. Sectorized antenna 1205 coupled to transmitter 1204 is used for transmitting data and other signals, e.g., control signals, pilot signal, beacon signals, etc., to wireless terminals 1300 (see FIG. 13) within each sector of the bases station's cell. In various aspects, base station 1200 may employ multiple receivers 1202 and multiple transmitters 1204, e.g., and individual receiver 1202 for each sector and an individual transmitter 1204 for each sector. Processor 1206, may be, e.g., a general purpose central processing unit (CPU). Processor 1206 controls operation of base station 1200 under direction of one or more routines 1218 stored in memory 1210 and implements the methods. I/O interface 1208 provides a connection to other network nodes, coupling the BS 1200 to other base stations, access routers, AAA server nodes, etc., other networks, and the Internet. Memory 1210 includes routines 1218 and data/information 1220.

Data/information 1220 includes data 1236, tone subset allocation sequence information 1238 including downlink strip-symbol time information 1240 and downlink tone information 1242, and wireless terminal (WT) data/info 1244 including a plurality of sets of WT information: WT 1 info 1246 and WT N info 1260. Each set of WT info, e.g., WT 1 info 1246 includes data 1248, terminal ID 1250, sector ID 1252, uplink channel information 1254, downlink channel information 1256, and mode information 1258.

Routines 1218 include communications routines 1222 and base station control routines 1224. Base station control routines 1224 includes a scheduler module 1226 and signaling routines 1228 including a tone subset allocation routine 1230 for strip-symbol periods, other downlink tone allocation hopping routine 1230 for the rest of symbol periods, e.g., non strip-symbols periods, and a beacon routine 1234.

Data 1236 includes data to be transmitted that will be sent to encoder 1214 of transmitter 1204 for encoding prior to transmission to WTs, and received data from WTs that has been processed through decoder 1212 of receiver 1202 following reception. Downlink strip-symbol time information 1240 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1242 includes information including a carrier frequency assigned to the base station 1200, the number and frequency of tones, and the set of tone subsets to be allocated to the strip-symbol periods, and other cell and sector specific values such as slope, slope index and sector type.

Data 1248 may include data that WT1 1300 has received from a peer node, data that WT 1 1300 desires to be transmitted to a peer node, and downlink channel quality report feedback information. Terminal ID 1250 is a base station 1200 assigned ID that identifies WT 1 1300. Sector ID 1252 includes information identifying the sector in which WT1 1300 is operating. Sector ID 1252 can be used, for example, to determine the sector type. Uplink channel information 1254 includes information identifying channel segments that have been allocated by scheduler 1226 for WT1 1300 to use e.g., uplink traffic channel segments for data, dedicated uplink control channels for requests, power control, timing control, etc. each uplink channel assigned to WT1 1300 includes one or more logical tones, each logical tone following an uplink hopping sequence. Downlink channel information 1256 includes information identifying channel segments that have been allocated by scheduler 1226 to carry data and/or information to WT1 1300, e.g., downlink traffic channel segments for user data. Each downlink channel assigned to WT1 1300 includes one or more logical tones, each following a downlink hopping sequence. Mode information 1258 includes information identifying the state of operation of WT1 1300, e.g. sleep, hold, on.

Communications routines 1222 control the base station 1200 to perform various communications operations and implement various communications protocols. Base station control routines 1224 are used to control the base station 1200 to perform basic base station functional tasks, e.g., signal generation and reception, scheduling, and to implement the steps of the method of some aspects including transmitting signals to wireless terminals using the tone subset allocation sequences during strip-symbol periods.

Signaling routine 1228 controls the operation of receiver 1202 with its decoder 1212 and transmitter 1204 with its encoder 1214. The signaling routine 1228 is responsible for controlling the generation of transmitted data 1236 and control information. Tone subset allocation routine 1230 constructs the tone subset to be used in a strip-symbol period using the method of the aspect and using data/information 1220 including downlink strip-symbol time info 1240 and sector ID 1252. The downlink tone subset allocation sequences will be different for each sector type in a cell and different for adjacent cells. The WTs 1300 receive the signals in the strip-symbol periods in accordance with the downlink tone subset allocation sequences; the base station 1200 uses the same downlink tone subset allocation sequences in order to generate the transmitted signals. Other downlink tone allocation hopping routine 1232 constructs downlink tone hopping sequences, using information including downlink tone information 1242, and downlink channel information 1256, for the symbol periods other than the strip-symbol periods. The downlink data tone hopping sequences are synchronized across the sectors of a cell. Beacon routine 1234 controls the transmission of a beacon signal, e.g., a signal of relatively high power signal concentrated on one or a few tones, which may be used for synchronization purposes, e.g., to synchronization the frame timing structure of the downlink signal and therefore the tone subset allocation sequence with respect to an ultra-slot boundary.

Figure 13:
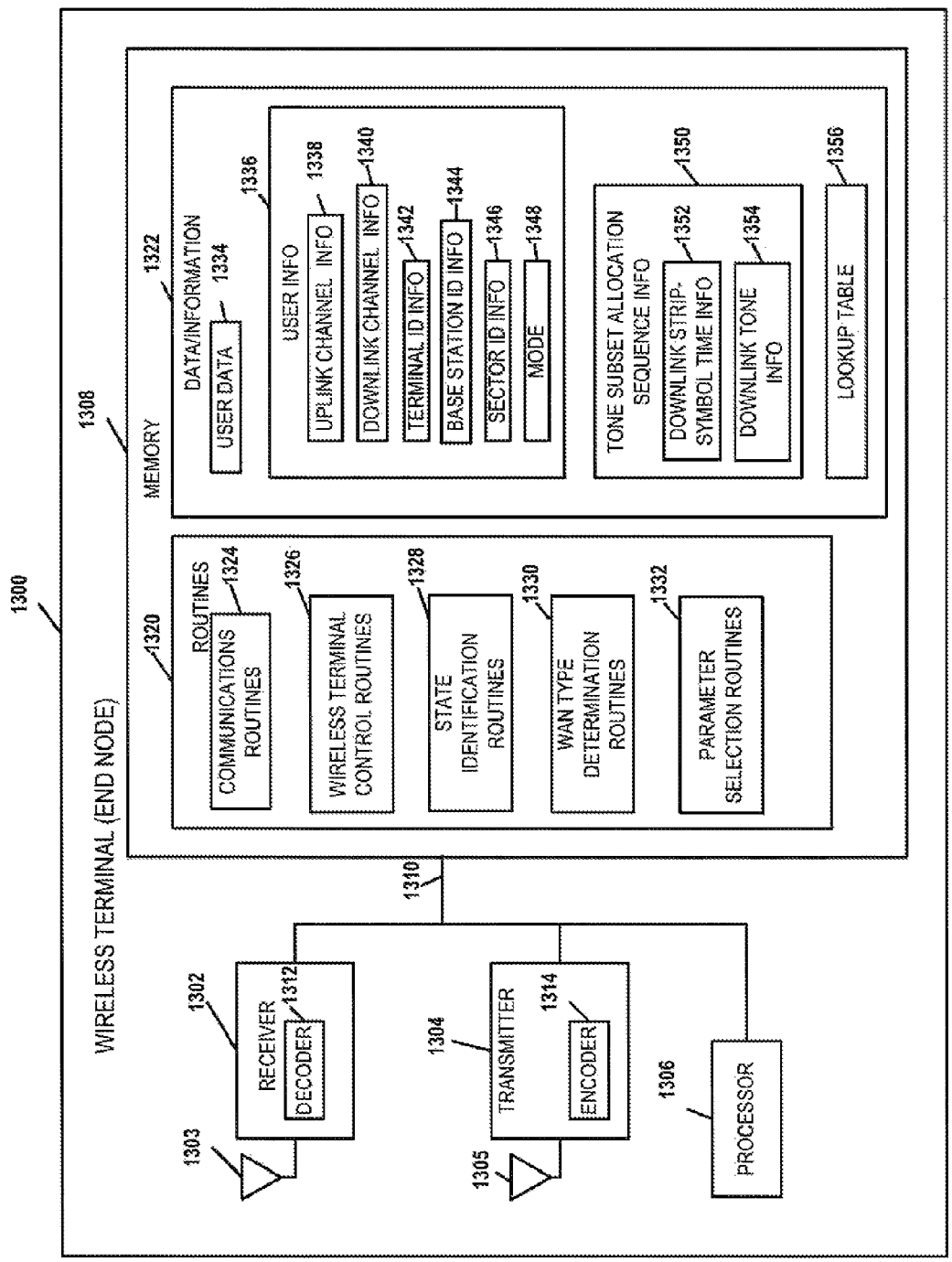
FIG. 13 is an illustration of an example wireless terminal (e.g., mobile device, end node, . . . ) implemented in accordance with various aspects described herein.

FIG. 13 illustrates an example wireless terminal (e.g., end node, mobile device, . . . ) 1300 which can be used as any one of the wireless terminals (e.g., end nodes, mobile devices, . . . ), e.g., EN(1) 1136, of the system 1100 shown in FIG. 11. Wireless terminal 1300 implements the tone subset allocation sequences. Wireless terminal 1300 includes a receiver 1302 including a decoder 1312, a transmitter 1304 including an encoder 1314, a processor 1306, and memory 1308 which are coupled together by a bus 1310 over which the various elements 1302, 1304, 1306, 1308 can interchange data and information. An antenna 1303 used for receiving signals from a base station 1200 (and/or a disparate wireless terminal) is coupled to receiver 1302. An antenna 1305 used for transmitting signals, e.g., to base station 1200 (and/or a disparate wireless terminal) is coupled to transmitter 1304.

The processor 1306 (e.g., a CPU) controls operation of wireless terminal 1300 and implements methods by executing routines 1320 and using data/information 1322 in memory 1308.

Data/information 1322 includes user data 1334, user information 1336, tone subset allocation sequence information 1350, and a lookup table 1356. User data 1334 may include data, intended for a peer node, which will be routed to encoder 1314 for encoding prior to transmission by transmitter 1304 to base station 1200, and data received from the base station 1200 which has been processed by the decoder 1312 in receiver 1302. User information 1336 includes uplink channel information 1338, downlink channel information 1340, terminal ID information 1342, base station ID information 1344, sector ID information 1346, and mode information 1348. Uplink channel information 1338 includes information identifying uplink channels segments that have been assigned by base station 1200 for wireless terminal 1300 to use when transmitting to the base station 1200. Uplink channels may include uplink traffic channels, dedicated uplink control channels, e.g., request channels, power control channels, and timing control channels. Each uplink channel includes one or more logic tones, each logical tone following an uplink tone hopping sequence. The uplink hopping sequences are different between each sector type of a cell and between adjacent cells. Downlink channel information 1340 includes information identifying downlink channel segments that have been assigned by base station 1200 to WT 1300 for use when BS 1200 is transmitting data/information to WT 1300. Downlink channels may include downlink traffic channels and assignment channels, each downlink channel including one or more logical tone, each logical tone following a downlink hopping sequence, which is synchronized between each sector of the cell.

User info 1336 also includes terminal ID information 1342, which is a base station 1200 assigned identification, base station ID information 1344 which identifies the specific base station 1200 that WT has established communications with, and sector ID info 1346 which identifies the specific sector of the cell where WT 1300 is presently located. Base station ID 1344 provides a cell slope value and sector ID info 1346 provides a sector index type; the cell slope value and sector index type may be used to derive tone hopping sequences. Mode information 1348 also included in user info 1336 identifies whether the WT 1300 is in sleep mode, hold mode, or on mode.

Tone subset allocation sequence information 1350 includes downlink strip-symbol tone information 1352 and downlink tone information 1354. Downlink strip-symbol time information 1352 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1354 includes information including a carrier frequency assigned to the base station 1200, the number and frequency of tones, and the set of tone subsets to be allocated to the strip-symbol periods, and other cell and sector specific values such as slope, slope index and sector type.

Routines 1320 include communications routines 1324, wireless terminal control routines 1326, state identification routines 1328, WAN type determination routines 1330, and parameter selection routines 1332. Communications routines 1324 control the various communications protocols used by WT 1300. For example, communications routines 1324 may enable communicating via a wide area network (e.g., with base station 1200) and/or a local area peer-to-peer network (e.g., directly with disparate wireless terminal(s)). Wireless terminal control routines 1326 control basic wireless terminal 1300 functionality including the control of the receiver 1302 and transmitter 1304. State identification routines 1328 control ascertaining states associated with peer-to-peer networks. For example, state identification routines 1328 may enable synchronizing wireless terminal with disparate wireless terminals associated with a common peer-to-peer network. Further, state identification routines 1328 may utilize lookup table 1356 in connection with identifying a state. WAN type determination routines 1330 control identification of a type of a wide area network (e.g., recognition of air interface technology) that shares bandwidth with the peer-to-peer network. Further, WAN type determination routines 1330 may employ lookup table 1356. Parameter selection routines 1332 control sets of parameters utilized for peer-to-peer communication. For example, parameters such as tone spacing, cyclic prefix, symbol time, and the like may be identified. Moreover, parameter selection routines 1332 may utilize lookup table 1356.

Figure 14:
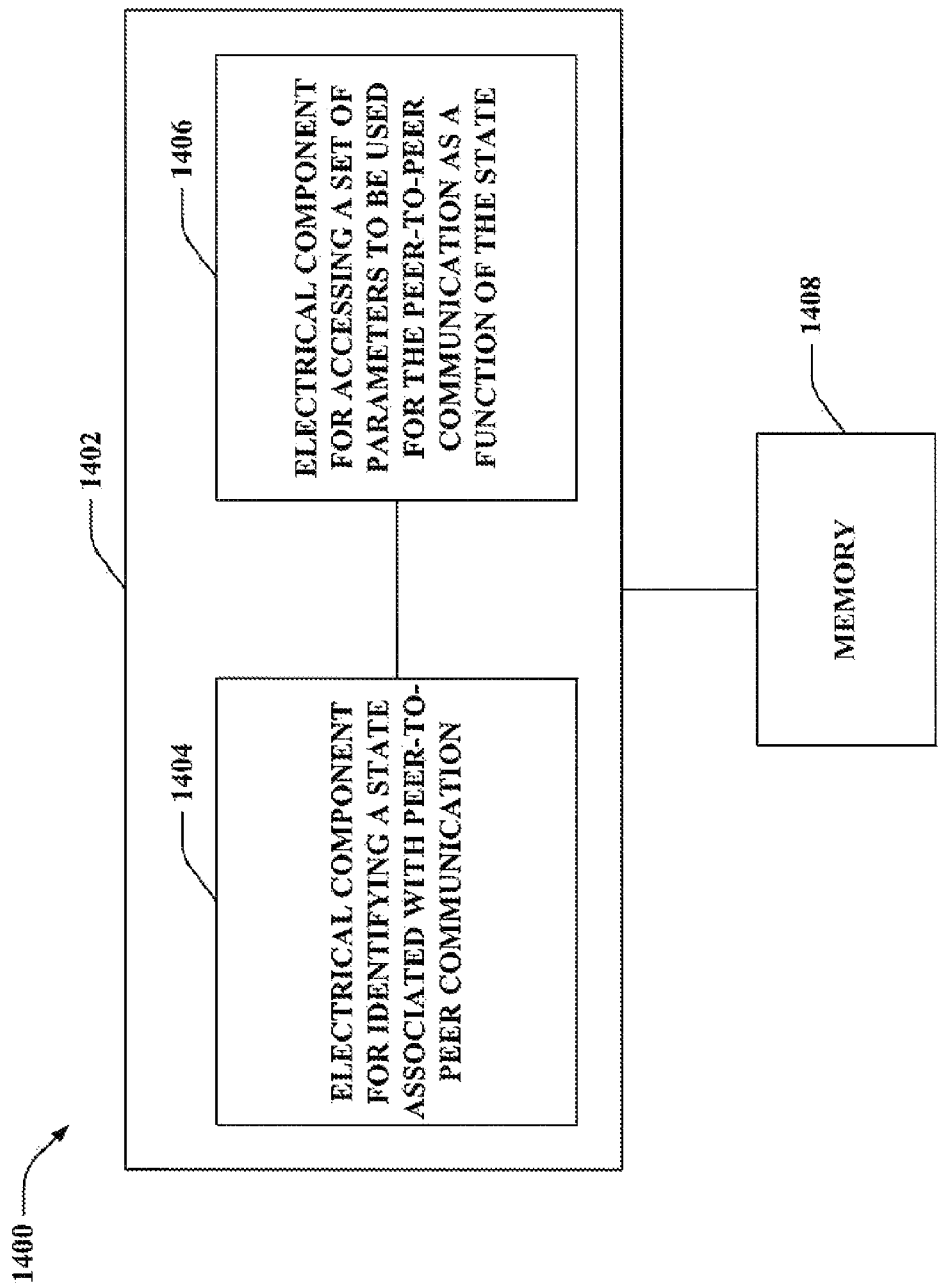
FIG. 14 is an illustration of an example system that enables communication over a local area peer-to-peer network.

With reference to FIG. 14, illustrated is a system 1400 that enables communication over a local area peer-to-peer network. For example, system 1400 may reside at least partially within a wireless terminal. It is to be appreciated that system 1400 is represented as including functional blocks, which may be functional blocks that represent functions implemented by a precursor, software, or combination thereof (e.g., firmware). System 1400 includes a logical grouping 1402 of electrical components that can act in conjunction. For instance, logical grouping 1402 may include an electrical component for identifying a state associated with peer-to-peer communication 1404. For example, states (e.g., peer discovery, control related traffic, data related traffic, paging, . . . ) may be associated with the peer-to-peer network at predetermined times. Further, peers may be synchronized to have a common understanding of time. Thus, based upon a time, the state may be ascertained. Further, logical grouping 1402 may comprise an electrical component for accessing a set of parameters to be used for the peer-to-peer communication as a function of the state 1406. The peer-to-peer network may utilize bandwidth that is shared with a wide area network. According to an example, the parameters to be employed for the peer-to-peer communication may be derived (e.g., based upon the state, the type of wide area network, and/or parameters corresponding to the wide area network). Pursuant to a further example, the peer-to-peer network parameters may be identified from a lookup table. Additionally, system 1400 may include a memory 1408 that retains instructions for executing functions associated with electrical components 1404 and 1406. While shown as being external to memory 1408, it is to be understand that one or more of electrical components 1404 and 1406 may exist within memory 1408.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using and suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a communications device, the method comprising:

utilizing a first symbol time during a first state of peer-to-peer operation, said first state being one of a peer discovery state or a control related traffic state, said first symbol time being specified in a first set of parameters; and utilizing a second symbol time which is longer than said first symbol time during a second state of peer-to-peer operation, said second state being a data related traffic state of peer-to-peer operation, said second symbol time being specified in a second set of parameters.

2. The method of claim 1, wherein utilizing a first symbol time during a first state of peer-to-peer operation includes using said first symbol time during a first time interval, said first time interval being one of a peer discovery time interval and a traffic control time interval; and wherein utilizing a second symbol time during a data related traffic state of peer-to-peer operation includes using said second symbol time during a second time interval which follows said first time interval, said second time interval being a data traffic time interval.

3. The method of claim 2, wherein said first state of peer-to-peer operation is a peer discovery state and said first time interval is a peer discovery time interval;

wherein said peer discovery state is a half-duplex mode state of peer-to-peer operation and said traffic state is not a half-duplex mode state of peer-to-peer operation; and wherein the method further comprises:

utilizing the first symbol time during the traffic control time interval which occurs between said peer discovery time interval and said data traffic time interval.

4. The method of claim 1, wherein utilizing a first symbol time during a first state of peer-to-peer operation includes using said first symbol time during a first time interval, said first time interval being a traffic control time interval;

wherein utilizing a second symbol time during a data related traffic state of peer-to-peer operation includes using said second symbol time during a data traffic time interval which follows said traffic control time interval and is part of a traffic interval to which said traffic control interval also corresponds; and wherein the first set of parameters includes a larger tone spacing than the second set of parameters.

5. A method that facilitates selecting parameters in a local area peer-to-peer network, comprising:

utilizing a first set of parameters for a first state in a peer-to-peer network, said first state being a peer discovery state of peer-to-peer operation, said first set of parameters specifying a first symbol time;

utilizing a second set of parameters for a second state in the peer-to-peer network, said second state being a traffic state of peer-to-peer operation, said second set of parameters specifying a second symbol time, said second symbol time being longer than said first symbol time;

wherein the local area peer-to-peer network uses an OFDM-based air interface technology and the parameters relate to tone spacing, symbol time, and/or cyclic prefix; and wherein the first set of parameters and the second set of parameters include parameters corresponding to similar cyclic prefixes.

6. The method of claim 1, further comprising identifying whether the first state or the second state is associated with a current time.

7. The method of claim 6, further comprising deriving the current time from a system source and determining the state associated with the current time using a predetermined mapping between the state and the current time.

8. The method of claim 7, wherein the system source is one of a broadcast signal from a base station of a wide area network or an access point, a satellite signal from a GPS satellite, and a clock signal from an internal clock.

9. The method of claim 6, further comprising accessing parameters as a function of the identified state.

10. The method of claim 9, accessing the parameters further comprises retrieving the parameters corresponding to the identified state from a lookup table retained in memory.

11. The method of claim 9, accessing the parameters further comprises calculating the parameters based at least in part upon the identified state.

12. The method of claim 1, wherein the peer-to-peer network shares bandwidth with a wide area network.

13. A method that facilitates selecting parameters in a local area peer-to-peer network, comprising:

utilizing a first set of parameters for a first state in a peer-to-peer network, said first state being a peer discovery state of peer-to-peer operation, said first set of parameters specifying a first symbol time;

utilizing a second set of parameters for a second state in the peer-to-peer network, said second state being a traffic state of peer-to-peer operation, said second set of parameters specifying a second symbol time, said second symbol time being longer than said first symbol time; and wherein the first set of parameters and the second set of parameters are a function of parameters related to a wide area network which shares bandwidth with the peer-to-peer network, the wide area network using a symbol time which is longer than the first and second symbol times.

14. A wireless communications apparatus, comprising:

a memory that includes instructions which when executed, control the communications apparatus to:

utilize a first symbol time during a first state of peer-to-peer operation, said first state being one of a peer discovery state or a control related traffic state, said first symbol time being specified in a first set of parameters; and utilize a second symbol time which is longer than said first symbol time during a second state of peer-to-peer operation, said second state being a data related traffic state of peer-to-peer operation, said second symbol time being specified in a second set of parameters; and a processor, coupled to the memory, configured to execute the instructions retained in the memory.

15. The wireless communications apparatus of claim 14, wherein controlling the communications apparatus to utilize a first symbol time during a first state of peer-to-peer operation includes controlling the communications apparatus to use said first symbol time during a first time interval, said first time interval being one of a peer discovery time interval and a traffic control time interval; and wherein controlling the communications apparatus to utilize a second symbol time during a data related traffic state of peer-to-peer operation includes controlling the communications apparatus to use said second symbol time during a second time interval which follows said first time interval, said second time interval being a data traffic time interval.

16. The wireless communications apparatus of claim 15, wherein the memory further includes instructions which when executed by said processor control the communications apparatus to recognize time periods associated with peer discovery, data related traffic, and control related traffic according to a predetermined mapping between the state and the time periods.

17. The wireless communications apparatus of claim 14, wherein the memory further retains instructions which when executed by said processor control the communications apparatus to synchronize the state with a peer located within communication range.

18. The wireless communications apparatus of claim 17, wherein the memory further retains instructions which when executed by said processor control the communications apparatus to derive timing information from a system source and determine the state associated with the timing information using a predetermined mapping between the state and the timing information.

19. The wireless communications apparatus of 18, wherein the system source is one of a broadcast signal from a base station of a wide area network or an access point, a satellite signal from a GPS satellite, and a clock signal from an internal clock.

20. The wireless communications apparatus of claim 14, wherein the memory further retains instructions which when executed by said processor control the communications apparatus to determine the state based upon a predetermined formula.

21. The wireless communications apparatus of claim 14, wherein the memory further retains a lookup table that includes parameter data for the peer-to-peer network that corresponds to said first and second of states.

22. The wireless communications apparatus of claim 21, wherein the memory further retains instructions which when executed by said processor control the communications apparatus to retrieve parameter data from the lookup table based upon the identified state.

23. The wireless communications apparatus of claim 14, wherein the memory further retains instructions which when executed by said processor control the communications apparatus to derive at least one parameter of said first set of parameters as a function of the identified state.

24. The wireless communications apparatus of claim 14, wherein the memory further retains instructions which when executed by said processor control the communications apparatus to identify an air interface technology of a wide area network that shares bandwidth with a peer-to-peer network over which the peer-to-peer communications traverse.

25. The wireless communications apparatus of claim 24, wherein the memory further retains instructions which when executed by said processor control the communications apparatus to select at least one parameter of said first set of parameters based upon the identified air interface technology of the wide area network.

26. A wireless communications apparatus, comprising:
means for identifying a state associated with peer-to-peer communication; and
means for utilizing a first symbol time during a first state of peer-to-peer operation, said first state being one of a peer discovery state or a control related traffic state, said first symbol time being specified in a first set of parameters, and for utilizing a second symbol time which is longer than said first symbol time during a second state of peer-to-peer operation, said second state being a data related traffic state of peer-to-peer operation, said second symbol time being specified in a second set of parameters.

27. The wireless communications apparatus of claim 26, wherein said means for utilizing a first symbol time during a first state of peer-to-peer operation and a second state during a second state of peer-to-peer operation use said first symbol time during a first time interval, said first time interval being one of a peer discovery time interval and a traffic control time interval, and use said second symbol time during a second time interval which follows said first time interval, said second time interval being a data traffic time interval.

28. The wireless communications apparatus of claim 27, further comprising means for selecting a shorter symbol time and a larger tone spacing when the identified state is the first state as compared to when the identified state is the second state.

29. A wireless communications apparatus that enables communication over a local area peer-to-peer network, comprising:
means for identifying a state associated with peer-to-peer communication;
means for accessing one of a plurality of different sets of parameters to be used for the peer-to-peer communication as a function of the state at a given point in time, said plurality of different sets of parameters including a first set of parameters specifying a first symbol time to be used in a peer discovery state of peer-to-peer operation and a second set of parameters specifying a second symbol time to be used in a traffic state of peer-to-peer operation, said second symbol time being longer than said first symbol time; and
means for selecting a similar cyclic prefix when the identified state is a peer discovery state, a control related traffic state, or a data related traffic state; and
wherein the peer-to-peer communication utilizes an OFDM-based air interface technology and the different sets of parameters relate to tone spacing, symbol time, and/or cyclic prefix.

30. The wireless communications apparatus of claim 26, further comprising means for identifying whether the first state or the second state is associated with a current time.

31. The wireless communications apparatus of claim 30, further comprising:
means for synchronizing the current time based upon a system source; and
means for determining the state associated with the current time utilizing a predetermined mapping between the state and the current time.

32. The wireless communications apparatus of claim 31, wherein the system source is one of a broadcast signal from a base station of a wide area network or an access point, a satellite signal from a GPS satellite, and a clock signal from an internal clock.

33. The wireless communications apparatus of claim 26, further comprising means for identifying a type of air interface technology associated with a wide area network that shares spectrum with the local area peer-to-peer network.

34. The wireless communications apparatus of claim 33, further comprising means for selecting a set of parameters from said plurality of different sets of parameters based upon the state and the air interface technology.

35. The wireless communications apparatus of claim 26, further comprising means for calculating at least one parameter of said first set of parameters based upon the identified state.

36. The wireless communications apparatus of claim 26, further comprising means for retrieving at least one parameter of the first set of parameters from a lookup table retained in memory based upon the identified state.

37. A non-transitory machine-readable medium having stored thereon machine-executable instructions for controlling a wireless communications apparatus to:
  determine a state of a peer-to-peer network;
  determine a type of wide area network that shares a common bandwidth with the peer-to-peer network; and
  acquire parameter data for use with the peer-to-peer network based on the type of the wide area network, said parameter data including a first set of parameters specifying a first symbol time to be used in a peer discovery state of peer-to-peer operation and a second set of parameters specifying a second symbol time to be used in a traffic state of peer-to-peer operation, said second symbol time being longer than said first symbol time.

38. The non-transitory machine-readable medium of claim 37, the machine-executable instructions further comprise deriving the state based upon a predetermined formula and a synchronized time.

39. The non-transitory machine-readable medium of claim 38, the machine-executable instructions further comprise synchronizing the time based upon information obtained from a system source and determining the state associated with the time using a predetermined mapping between the state and the time.

40. The non-transitory machine-readable medium of claim 39, wherein the system source is one of a broadcast signal from a base station of a wide area network or an access point, a satellite signal from a GPS satellite, and a clock signal from an internal clock.

41. The non-transitory machine-readable medium of claim 37, the machine-executable instructions further comprise obtaining parameters related to the wide area network and acquiring parameter data as a function of the wide area network related parameters.

42. The non-transitory machine-readable medium of claim 37, wherein the peer-to-peer network uses an OFDM-based air interface technology and the parameter data relates to tone spacing, symbol time, and/or cyclic prefix.

43. The non-transitory machine-readable medium of claim 42, the machine-executable instructions further comprise acquiring parameter data that includes a shorter symbol time and a larger tone spacing when the identified state relates to peer discovery or control related traffic as compared to when the identified state relates to data related traffic.

44. The non-transitory machine-readable medium of claim 42, the machine-executable instructions further comprise obtaining parameter data that includes a similar cyclic prefix when the identified state is a peer discovery state, a control related traffic state, and a data related traffic state.

45. In a wireless communication system, an apparatus comprising:
  a processor configured to:
    utilize a first symbol time during a first state of peer-to-peer operation, said first state being one of a peer discovery state or a control related traffic state, said first symbol time being specified in a first set of parameters; and
    utilize a second symbol time which is longer than said first symbol time during a second state of peer-to-peer operation, said second state being a data related traffic state of peer-to-peer operation, said second symbol time being specified in a second set of parameters.

46. A method of operating a wireless communications device, comprising:
  determining a state of a peer-to-peer network;
  determining a type of wide area network that shares a common bandwidth with the peer-to-peer network; and
  acquiring parameter data for use with the peer-to-peer network based on the type of the wide area network, said parameter data including a first set of parameters specifying a first symbol time to be used in a peer discovery state of peer-to-peer operation and a second set of parameters specifying a second symbol time to be used in a traffic state of peer-to-peer operation, said second symbol time being longer than said first symbol time.

47. A wireless communications apparatus comprising:
  means for determining a state of a peer-to-peer network;
  means for determining a type of wide area network that shares a common bandwidth with the peer-to-peer network; and
  means for acquiring parameter data for use with the peer-to-peer network based on the type of the wide area network, said parameter data including a first set of parameters specifying a first symbol time to be used in a peer discovery state of peer-to-peer operation and a second set of parameters specifying a second symbol time to be used in a traffic state of peer-to-peer operation, said second symbol time being longer than said first symbol time.

48. A wireless communications apparatus comprising:
  at least one processor configured to:
    determine a state of a peer-to-peer network;
    determine a type of wide area network that shares a common bandwidth with the peer-to-peer network; and
    acquire parameter data for use with the peer-to-peer network based on the type of the wide area network, said parameter data including a first set of parameters specifying a first symbol time to be used in a peer discovery state of peer-to-peer operation and a second set of parameters specifying a second symbol time to be used in a traffic state of peer-to-peer operation, said second symbol time being longer than said first symbol time; and
  a memory coupled to said at least one processor.

49. A method of operating a communications device, the method comprising:
  utilizing a first symbol time during a first state of peer-to-peer operation, said first state being one of a peer discovery state or a control related traffic state, said first symbol time being specified in a first set of parameters, utilizing a first symbol time during a first state of peer-to-peer operation including both transmitting and receiving during a first time interval; and
  utilizing a second symbol time which is longer than said first symbol time during a second state of peer-to-peer operation, said second state being a data related traffic state of peer-to-peer operation, said second symbol time being specified in a second set of parameters, utilizing a second symbol time including performing a single one of transmitting and receiving during a second time interval.

50. The method of claim 5, wherein said similar cyclic prefixes have the same length.

* * * * *